(12) United States Patent
Oteru et al.

(10) Patent No.: US 11,546,276 B2
(45) Date of Patent: Jan. 3, 2023

(54) COMMUNICATION INPUT-OUTPUT DEVICE

(71) Applicant: Nippon Telegraph and Telephone Corporation, Tokyo (JP)

(72) Inventors: Shoko Oteru, Tokyo (JP); Tomoaki Kawamura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 68 days.

(21) Appl. No.: 17/057,055

(22) PCT Filed: May 9, 2019

(86) PCT No.: PCT/JP2019/018560
§ 371 (c)(1),
(2) Date: Nov. 19, 2020

(87) PCT Pub. No.: WO2019/225336
PCT Pub. Date: Nov. 28, 2019

(65) Prior Publication Data
US 2021/0184993 A1 Jun. 17, 2021

(30) Foreign Application Priority Data
May 21, 2018 (JP) .............................. JP2018-096925

(51) Int. Cl.
*H04L 49/901* (2022.01)
*G06F 12/02* (2006.01)

(52) U.S. Cl.
CPC ................................ *H04L 49/901* (2013.01)

(58) Field of Classification Search
None
See application file for complete search history.

(56) References Cited

U.S. PATENT DOCUMENTS

| | | | | |
|---|---|---|---|---|
| 5,889,714 A | * | 3/1999 | Schumann | G11C 7/1072 365/189.12 |
| 7,711,938 B2 | * | 5/2010 | Wise | H04N 19/61 345/506 |
| 8,151,008 B2 | * | 4/2012 | Simon | G06F 13/30 710/22 |
| 10,320,034 B2 | * | 6/2019 | Hallmark | H01M 50/505 |
| 2003/0120881 A1 | * | 6/2003 | Lai | G06F 12/0215 711/E12.072 |

(Continued)

FOREIGN PATENT DOCUMENTS

| | | | |
|---|---|---|---|
| JP | 201110195 A | | 1/2011 |
| JP | 2016157284 A | * | 9/2016 |
| JP | 201832925 A | | 3/2018 |

*Primary Examiner* — Khaled M Kassim
*Assistant Examiner* — Berhanu D Belete
(74) *Attorney, Agent, or Firm* — Slater Matsil, LLP

(57) ABSTRACT

In a recording device, a data memory including a DRAM having a write pointer for each of banks, and a queue control memory that stores an active flag is provided. When frame data is written into a write-target queue, a bank for which an active flag indicates an activated state is selected as a write-target bank among the banks to write the frame data, and if there is no bank for which an active flag indicates an activated state, a bank for which an active flag indicates a deactivated state is selected as a write-target bank, a row address of a write pointer of the bank is activated, and thereafter the frame data is written.

20 Claims, 22 Drawing Sheets

(56) References Cited

U.S. PATENT DOCUMENTS

| | | | | |
|---|---|---|---|---|
| 2004/0088472 | A1* | 5/2004 | Nystuen | G06F 13/1647 |
| | | | | 711/154 |
| 2009/0055570 | A1* | 2/2009 | Madrid | G06F 13/161 |
| | | | | 711/E12.001 |
| 2011/0261698 | A1* | 10/2011 | Kamerkar | H04L 43/0888 |
| | | | | 370/252 |

* cited by examiner

| | | | |
|---|---|---|---|
| 0_0 | P1-1 | 1_0 | UNUSED |
| 0_1 | P1-2 | 1_1 | UNUSED |
| 0_2 | P2-1 | 1_2 | UNUSED |
| 0_3 | P2-2 | 1_3 | UNUSED |
| 0_4 | P1-3 | 1_4 | UNUSED |
| 0_5 | P2-3 | 1_5 | UNUSED |
| 0_6 | UNUSED | 1_6 | UNUSED |
| 0_7 | UNUSED | 1_7 | UNUSED |
| 0_8 | UNUSED | 1_8 | UNUSED |
| ⋮ | ⋮ | ⋮ | ⋮ |
| 0_N | UNUSED | 1_N | UNUSED |

Fig. 2

|  | ADD | PN |
|---|---|---|
| 0_0 | 0_1 | 0 |
| 0_1 | 0_4 | 1 |
| 0_2 | 0_3 | 0 |
| 0_3 | 0_5 | 1 |
| 0_4 | — | 1 |
| 0_5 | — | 1 |
| 0_6 | — | — |
| 0_7 | — | — |
| 0_8 | — | — |
| ⋮ | ⋮ | ⋮ |
| 0_N | — | — |

|  | ADD | PN |
|---|---|---|
| 1_0 | — | — |
| 1_1 | — | — |
| 1_2 | — | — |
| 1_3 | — | — |
| 1_4 | — | — |
| 1_5 | — | — |
| 1_6 | — | — |
| 1_7 | — | — |
| 1_8 | — | — |
| ⋮ | ⋮ | ⋮ |
| 1_N | — | — |

Fig. 4

|  | SAR | LAR | NUMBER OF USED ADDRESSES |
|---|---|---|---|
| P1 | 0_0 | 0_4 | 3 |
| P2 | 0_2 | 0_5 | 3 |
| ⋮ |  | ⋮ |  |
| PM | — | — | — |

Variables:
- Address register of QM *ADD*;
  (QM has different ADD for each bank)
- Pointer of QM *PN*;
- Valid address register (for each bank) *VAR_b*;
- Start Address register of PM *SAR*;
- Temporary register for VAR *TMPV*;
- Temporary register for SAR *TMPS*;
- Access history (for n times of access) *AAR_n*;
- Active Flag register (for each bank) *AFR_b*;

Input: Queue designation information *P*;

1: $EoF_i \leftarrow PN_{SAR_i}$;                                EoF OUTPUT (R1)
2: $TMPV \leftarrow f(VAR\_b, SAR_i)$;                           VAR RETENTION (R2)
3: $TMPS \leftarrow SAR_{P_i}$;                                  SAR RETENTION (R3)
4: $VAR\_b \leftarrow SAR_i$ or $VAR\_b$;                        VAR UPDATE (R4)
5: $SAR_{P_i} \leftarrow ADD_{SAR_{P_i}}$;                       SAR UPDATE (R5)
6: $ADD_{SAR_{P_i}} \leftarrow f(VAR\_b, SAR_{P_i})$;            ADDRESS UPDATE (R6)
7: $AAR\_1 \leftarrow f(VAR\_b, AAR\_n)$;                        AAR UPDATE (R7)
8: $AAR\_n \leftarrow AAR\_(n-1)$;
9: if $f(VAR\_b, TMPS)$ then
10:     $AFR\_b \leftarrow 1$;                                    AFR UPDATE (R8)
11: else
12:     $AFR\_b \leftarrow 0$;
13: end if OUTPUT TO DRAM ACCESS UNIT
    $SAR_i, EoF, P_i$
INPUT FROM DRAM ACCESS UNIT
    $D, EoF, P_i$
Output: $D, EoF, P_i$

Fig. 14

COMMUNICATION INPUT-OUTPUT DEVICE

CROSS-REFERENCE TO RELATED APPLICATIONS

This application is a national phase entry of PCT Application No. PCT/JP2019/018560, filed on May 9, 2019, which claims priority to Japanese Application No. 2018-096925, filed on May 21, 2018, which applications are hereby incorporated herein by reference.

TECHNICAL FIELD

The present invention relates to data communication technology, and particularly relates to memory access control technology employed in a communication input/output apparatus for inputting and outputting communication data (frame data).

BACKGROUND

There is proposed a configuration known in the art such as the configuration described in PTL 1 as a communication input/output apparatus for inputting and outputting communication data such as Ethernet (registered trademark) frame data, in which the communication input/output apparatus is used in data communication such as the Internet. FIG. 27 is a block diagram illustrating a configuration of a communication input/output apparatus (built-in memory) known in the art.

This communication input/output apparatus includes a multiplexer MUX, a recording device MEM, and a demultiplexer DEMUX.

The MUX adds, to frame data being input, queue designation information corresponding to an output destination of the frame data by a queue designation information adding unit provided for each input port, and thereafter multiplexes the frame data by a multiplexing unit, and outputs the resultant frame data.

The MEM receives, by a writing control unit, the frame data output from the MUX in a time division multiplex manner, refers to the queue designation information and a queue map that are added to each of the frame data, and writes the frame data to an address of a queue corresponding to the queue designation information from among queues logically set up for each output destination of frame data in a built-in data memory. The MEM also reads, in response to a reading instruction from the DEMUX, frame data from the corresponding queue by a reading control unit and outputs the frame data to the DEMUX.

The DEMUX reads, by a reading unit, based on a priority control logic for each output port, frame data from a queue at an output destination corresponding to a priority output port in the MEM, distributes the frame data to a corresponding output port by a distribution unit, and converts the frame data so that the frame data has a communication speed of the output port by a speed conversion unit provided for each output port to output the frame data.

FIG. 28 is an explanatory table showing correspondence between a queue and an output port, and shows a case where the number of output ports is three. In FIG. 28(a), a queue and an output port are associated by one-to-one, but associating a queue and an output port by one-to-many as in FIG. 28(b) can cope with a case where one item of frame data is output by a plurality of output ports. Alternatively, as shown in FIG. 28(c), a queue according to the priority for reading may be associated with each output port.

CITATION LIST

Patent Literature

PTL 1: JP 2011-010195 A

SUMMARY

Technical Problem

In such a communication input/output apparatus, the storage capacity required in the MEM increases as the number of output systems increases, and thus, a DRAM is used as a data memory. However, there is a problem that, in DRAM access, latency occurs due to activation of a row address in each bank, and therefore, in some instances, effective throughput of DRAM access is extremely deteriorated, making it impossible to follow processing speed of frame data, and thus, communication quality is degraded.

In general, in the DRAM, if data is written to any row address of any bank, the row address needs to be activated in the bank, and in a case of accessing a different row address of an identical bank, it is necessary to wait for access with the row address to be completed and then activate a new row address, and thus, relatively long latency occurs due to the activation of the row address in accessing the identical bank. Specifically, the latency occurs when a different row address of the identical bank is continuously accessed. Other conditions for occurrence of latency include a case of writing data into the identical bank after data is read, and a case of reading data from the identical bank after data is written.

The above-described latencies cause deterioration in effective throughput for DRAM access. Thus, especially, in a communication input/output apparatus, short frame data may be successively input in a burst manner, and in such a case, if a different row address of the identical bank is frequently accessed, the effective throughput may be significantly deteriorated. In addition, power consumption increases as activation processing frequently occurs.

An embodiment of the present invention has been made to solve the above-described problems, and an object of embodiments of the present invention is to provide memory access control technology with which deterioration in effective throughput for DRAM access can be suppressed and power consumption due to activation processing can be reduced.

Means for Solving the Problem

To achieve such an object, a communication input/output apparatus according to embodiments of the present invention includes a multiplexer configured to multiplex successively input communication data, by adding queue designation information indicating a queue corresponding to an output system through which the communication data is to be output, a recording device configured to temporarily accumulate the communication data transferred from the multiplexer in a write-target queue designated by the queue designation information from among a plurality of queues logically formed in a data memory, and a demultiplexer configured to read the communication data from a read-target queue, from among the plurality of queues, corresponding to an output system selected based on a priority control logic, and convert the communication data so that the communication data has a communication speed of an output port corresponding to the output system to output the communication data. The recording device includes the data memory that is composed of a DRAM including a plurality of banks and having a write pointer for each bank and stores communication data in the plurality of queues, a queue control memory that stores an active flag indicating whether or not a row address of the write pointer is in an activated state for each bank, and a DRAM access unit configured to, when the communication data is written into the write-target queue, select, from among the plurality of banks, a bank for which an active flag indicates an activated state, as a write-target bank to write the communication data, and select, if there is no bank for which an active flag indicates an activated state, a bank for which an active flag indicates a deactivated state, as a write-target bank, activate a row address of a write pointer of the bank, and thereafter write the communication data.

In an example of a configuration of the communication input/output apparatus according to embodiments of the present invention, the recording device further includes a queue control memory that stores queue control information used when controlling writing and reading to and from the queue of the data memory, a writing control unit configured to instruct the DRAM access unit to write the communication data transferred from the multiplexer into the write-target queue, based on queue control information of the queue control memory, and a reading control unit configured to instruct the DRAM access unit to read communication data from the read-target queue, based on queue control information of the queue control memory, and transfer the read communication data to the demultiplexer. A plurality of virtual storage addresses are used on a virtual data memory, and the queue control memory stores the active flag for each bank, stores, for each virtual storage address used on a virtual data memory, a subsequent address indicating a virtual storage address of communication data subsequent to communication data written to each virtual storage address, stores, for each queue, a queue start address and a queue last address indicating a start and a last of the virtual storage address to which communication data of the each queue is written, and stores, in common to each of the plurality of queues, a next writing address for each bank indicating a virtual storage address to which communication data is to be written next, the next writing address corresponding one-to-one to the write pointer for each bank. The writing control unit instructs, when the communication data is written into the write-target queue, the DRAM access unit to write the communication data to a write-target virtual address including the next writing address of a bank selected as the write-target bank, updates a queue last address of the write-target queue, a subsequent address for the queue last address before the communication data is written, and a next writing address of a bank selected as the write-target bank, sets an active flag of the write-target bank to a value indicating an activated state if a row address of a current write pointer corresponding to the write-target virtual address of the write-target bank and a row address of an updated write pointer corresponding to an updated next writing address are the same, and sets the active flag to a deactivated state if the row addresses are different from each other. The reading control unit instructs, when the communication data is read from the read-target queue, the DRAM access unit to read the communication data from a read-target virtual address including a queue start address of the read-target queue, updates a queue start address of the read-target queue, a next writing address of a read-target bank, and a subsequent address for a next writing address of a new read-target bank, sets an active flag of the read-target bank to a value indicating an activated state if a row address of a read pointer corresponding to the read-target virtual address of the read-target bank and a row address of an updated write pointer corresponding to an updated next writing address are the same, and sets the active flag to a deactivated state if the row addresses are different from each other.

In an example of a configuration of the communication input/output apparatus according to the present invention, the recording device further includes a queue-using address number memory that stores, for each queue, the number of used addresses indicating the number of virtual storage addresses on the virtual data memory used by the plurality of queues, and an access arbitration unit configured to, when the communication data is written into the write-target queue, calculate the required number of addresses indicating the number of virtual storage addresses required for writing the communication data, based on a data length of the communication data, calculate the number of remaining addresses indicating the number of virtual storage addresses available for the writing, based on the number of used addresses of the write-target queue or the plurality of queues that is acquired from the queue-using address number memory, determine whether writing the communication data is available by comparing the required number of addresses and the number of remaining addresses, and instruct writing of the communication data in response to a determination that the writing is available.

Effects of Embodiments of the Invention

According to embodiments of the present invention, in a recording device that temporarily accumulates communication data transferred from a multiplexer in a write-target queue designated by queue designation information from among a plurality of queues logically formed in a data memory, even if the data memory is composed of a DRAM, the number of activations of row addresses can be reduced. Thus, deterioration in effective throughput for DRAM access can be suppressed, and power consumption due to activation processing can be reduced.

Furthermore, information of a bank selected when communication data is written can be stored in a queue control memory that stores queue control information, and the information can be used when the communication data is read.

BRIEF DESCRIPTION OF THE DRAWINGS

FIG. 2 illustrates a storage example of a virtual data memory.

FIG. 4 illustrates a storage example of an address queue management memory.

FIG. 5 illustrates a storage example of a queue start address register and a queue last address register.

FIG. 13 is an explanatory diagram illustrating a writing operation in a writing control unit.

FIG. 14 is an explanatory diagram illustrating a reading operation in a reading control unit.

DETAILED DESCRIPTION OF ILLUSTRATIVE EMBODIMENTS

Embodiments of the present invention will be described below with reference to the drawings.

First Embodiment

Figure 1:
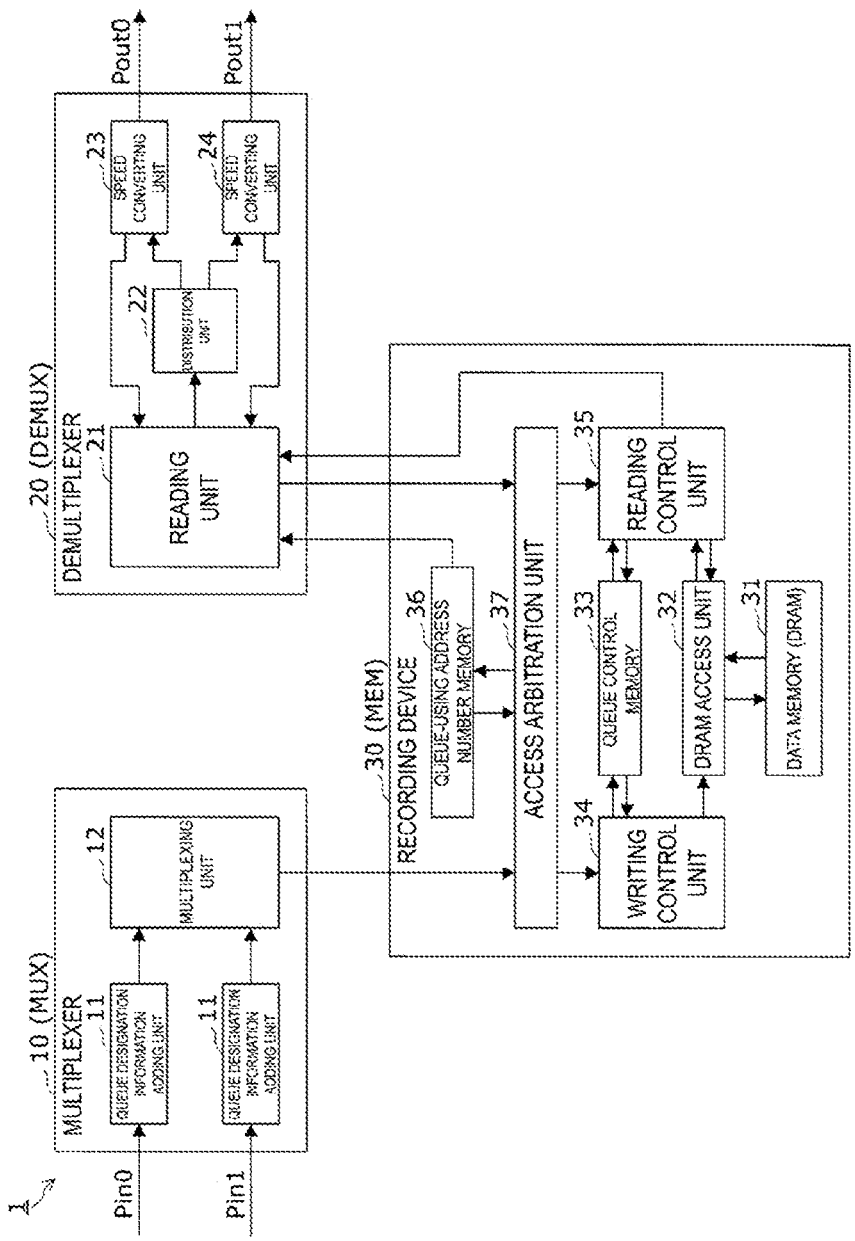
FIG. 1 is a block diagram illustrating a configuration of a communication input/output apparatus according to a first embodiment.

First, a communication input/output apparatus 1 according to a first embodiment of the present invention will be described with reference to FIG. 1. FIG. 1 is a block diagram illustrating a configuration of a communication input/output apparatus according to the first embodiment.

The communication input/output apparatus 1 is a communication input/output apparatus for inputting and outputting communication data such as Ethernet (registered trademark) frame data, in which the communication input/output apparatus 1 is used in Internet communication or the like, and has a function of separating communication data input through one or more input ports, for each of output systems through which the communication data is to be output, and converting the communication data so that the communication data has a communication speed of an output port corresponding to the output system to output the communication data.

As illustrated in FIG. 1, the communication input/output apparatus 1 includes a multiplexer (MUX) 10, a demultiplexer (DEMUX) 20 with built-in memory access control function, and a recording device (MEM) 30 with built-in access control function. A case where communication data to be input and output by the communication input/output apparatus 1 is frame data is described below in an example, but the present invention is not limited to this case, and various types of communication data such as a packet and an ATM cell can be input and output in a similar manner to a case of the frame data.

The multiplexer 10 has a function of multiplexing frame data successively input from the outside, by adding queue designation information corresponding to an output system through which the frame data is to be output.

The recording device 30 has a function of temporarily accumulating frame data transferred from the multiplexer 10 in a write-target queue designated by the queue designation information added to the frame data from among a plurality of queues logically formed in a data memory.

The demultiplexer 20 has a function of reading, from a read-target queue corresponding to an output system selected based on priority control, from among the queues in the recording device 30, frame data temporarily accumulated in the read-target queue, and converting the frame data so that the framed data has a communication speed of an output port corresponding to the output system to output the frame data.

According to the present embodiment, in the recording device 30, a data memory 31 is composed of a DRAM having a write pointer for each bank, the recording device 30 includes a queue control memory 33 that stores an active flag indicating whether or not a row address of the write pointer is in an activated state for each bank, and a DRAM access unit 32 is configured to, when frame data is written into a write-target queue, select, from among banks, a bank for which an active flag indicates an activated state, as a write-target bank to write the frame data into the bank, and if there is no bank for which an active flag indicates an activated state, select a bank for which an active flag indicates a deactivated state, as a write-target bank to activate a row address of a write pointer of the bank, and thereafter write the frame data.

In the present embodiment, as illustrated in FIG. 1, a case where two input ports Pin0 and Pin1 are provided as an input port Pin and two output ports Pout0 and Pout1 are provided as an output port Pout is described in an example, but the number of the input ports Pin and output ports Pout is not limited to this case. Three or more ports may be provided for one or both of the input port Pin and the output port Pout, and the number of input ports and the number of output ports may be different. Note that the number of input ports may be one.

Multiplexer

Next, the multiplexer 10 employed in the communication input/output apparatus 1 according to the present embodiment will be described in detail with reference to FIG. 1.

As illustrated in FIG. 1, the multiplexer 10 includes, as main circuit units, a queue designation information adding unit 11 and a multiplexing unit 12.

The queue designation information adding unit 11 is provided for each of the input ports Pin0 and Pin1, and has a function of outputting frame data input from a corresponding input port Pin to the multiplexing unit 12 after adding queue designation information corresponding to an output destination of the frame data and frame length information (Byte) of the frame data. At this time, as the frame length information, information obtained by calculating the number of Bytes from a start to a last of the frame data as a frame length may be added when the frame data is added to the multiplexing unit 12, for example.

One multiplexing unit 12 is provided in common for the queue designation information adding units 11, and has a function of multiplexing the frame data output from each of the queue designation information adding units 11 in a time division manner to output the frame data to the recording device 30.

In the multiplexer 10, the designation of a queue corresponding to an output destination of the frame data may be achieved by a bridge function of IEEE802.1D, or the like and specifically, an output port search by MAC address learning, output port designation by a VLAN-ID, and the like may be applied (see PTL 1, for example).

Demultiplexer

Next, the demultiplexer 20 employed in the communication input/output apparatus 1 according to the present embodiment will be described in detail with reference to FIG. 1.

As illustrated in FIG. 1, the demultiplexer 20 includes, as main circuit units, a reading unit 21, a distribution unit 22, and speed conversion units 23 and 24.

The reading unit 21 has a function of referring to an accumulation state of each of queues acquired from the recording device 30 and a reading stop instruction signal output from the speed conversion units 23 and 24, and selecting an output system through which frame data is to be preferentially output, based on a priority control logic for each of the output ports Pout0 and Pout1. The reading unit 21 has a function of outputting a reading request that requests to read frame data from a read-target queue corresponding to the output system, and outputting, in response thereto, the frame data transferred from the recording device 30 to the distribution unit 22.

The priority control logic may employ a general priority control logic. An example of the general priority control logic includes a logic in which, for example, if the capacity of queues is the same, a queue having the largest amount of communication data accumulated in the queue is first read from among queues from which data can be read (see PTL 1, for example).

Furthermore, the reading unit 21 indicates, when outputting a reading request to the recording device 30, read data amount information indicating a data amount of read data in addition to queue designation information designating a read-target queue, to the recording device 30.

Regarding the read data amount information, for example, if a data accumulation amount of a read-target queue is less than or equal to a preset threshold value, a value equal to the data accumulation amount may be output as the read data amount information, and if the data accumulation amount exceeds the threshold value, a value of the threshold value may be output as the read data amount information.

The distribution unit 22 has a function of distributing frame data output from the reading unit 21 to the speed conversion units 23 and 24 of a corresponding output port, based on queue designation information added to the frame data.

The speed conversion units 23 and 24 are each provided for each output port, and have a function of converting frame data distributed from the distribution unit 22 so that the frame data has a communication speed of the output port to output the frame data, and a function of outputting a reading stop instruction signal to the reading unit 21 in accordance with an output state of the frame data.

Note that the queue designation information added to the frame data is deleted by the distribution unit 22 or the speed conversion units 23 and 24.

Recording Apparatus

Next, the recording device 30 employed in the communication input/output apparatus 1 according to the present embodiment will be described in detail with reference to FIG. 1.

As illustrated in FIG. 1, the recording device 30 includes, as main circuit units, the data memory 31, the DRAM access unit 32, the queue control memory 33, a writing control unit 34, a reading control unit 35, a queue-using address number memory 36, and an access arbitration unit 37.

The data memory 31 is composed of a general DRAM (DRAM chip) having a plurality of row addresses for each bank, and has a function of storing frame data by using a write pointer for each bank. Specifically, the data memory 31 may be composed of one or more DRAM chips to correspond to a write pointer for each bank, and may have a configuration in which a plurality of queues are provided for one output system in addition to a configuration in which one queue is provided for each output system. In the preset embodiment, one DRAM chip will be shared by a plurality of queues.

The data memory 31 is provided with a plurality of storage areas having unique storage addresses. Each queue is configured by optionally coupling a virtual storage area of a virtual data memory having a virtual storage address equivalent to a storage address of the data memory 31, whether the virtual storage address is continuous or discontinuous or whether the virtual storage address is arranged in ascending or descending order. Note that the virtual storage address is used for managing frame data independently of an actual row address, a column address, and a bank number used for accessing a DRAM, and is address information in a virtual memory space.

A virtual storage address corresponds one-to-one to a set of actual row and column addresses for each bank. Similarly, a next writing address also corresponds one-to-one to a write pointer (including row and column addresses) for each bank.

FIG. 2 illustrates a storage example of a virtual data memory. Here, a case is assumed where data written by the writing control unit 34 is stored for each virtual storage area having a unique virtual storage address ADM (0 to N: N is an integer of 2 or greater).

At this time, if one frame is longer than a data size for one virtual address, the one frame is divided into a plurality of items of data D in accordance with the data size of the one virtual address to be each written to a plurality of different virtual storage addresses. For example, in a case of FIG. 2, data items P1-1, P1-2, and P1-3 of a queue P1 are stored at virtual storage addresses 0, 1, and 4 of a bank 0, and data items P2-1, P2-2, and P2-3 of a queue P2 are stored at virtual storage addresses 2, 3, and 5 of the bank 0. A context of these data items and a corresponding relationship between the data and a frame are managed by an address queue management memory described later. Note that if one frame is shorter than the data size of a virtual storage area, frame data is stored in one virtual storage area.

The DRAM access unit 32 has a function of writing frame data to a corresponding address in the data memory 31 in response to a DRAM writing instruction from the writing control unit 34, and a function of reading frame data from a corresponding address in the data memory 31 in response to a DRAM reading instruction from the reading control unit 35.

When writing frame data, the DRAM access unit 32 has a function of writing frame data to a designated virtual storage address (row address and column address) if a write-target row address of a designated bank is in an activated state, and a function of writing frame data after activating the write-target row address if the write-target row address is not in an activated state.

Furthermore, when reading frame data, the DRAM access unit 32 has a function of, if a read-target row address is in an activated state in a designated read-target bank, reading frame data from the read-target row address of the read-target bank, and a function of, if the read-target row address is not in an activated state in the read-target bank, reading frame data after activating the read-target row address of the read-target bank.

The queue control memory 33 includes a semiconductor memory such as an SRAM chip, and has a function of storing various types of queue control information used for controlling, writing and reading of frame data to and from a queue formed on the data memory 31.

Figure 3:
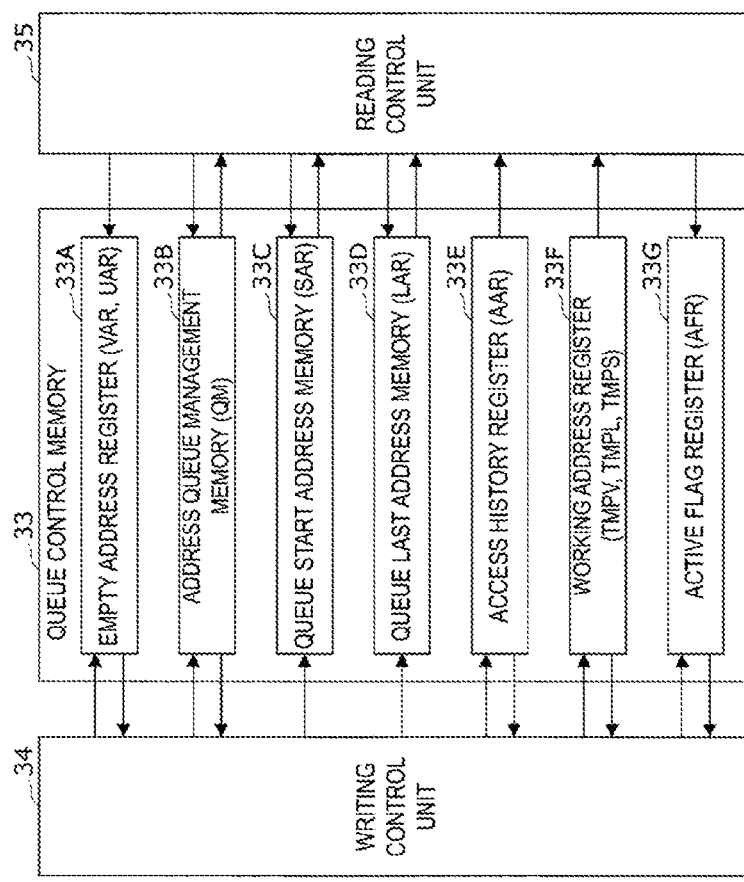
FIG. 3 is a block diagram illustrating a configuration of a queue control memory.

FIG. 3 is a block diagram illustrating a configuration of a queue control memory. The queue control memory 33 includes a plurality of storage units including registers and memories. Each of the storage units mainly includes an empty address register (VAR, UAR) 33A, an address queue management memory (QM) 33B, a queue start address register (SAR) 33C, a queue last address register (LAR) 33D, an access history register (AAR) 33E, a working address register (TMPV, TMPL, TMPS) 33F, and an active flag register (AFR) 33G. Note that a register name is sometimes described as a variable name for ease of understanding.

The empty address register (VAR, UAR) 33A has a function of storing, in common to queues, a next writing address VAR and an unused address URA for each bank. Of these, the valid address register (VAR) is address information for each bank indicating, when frame data to be received next from the multiplexer 10 is written, a virtual storage address to which the frame data is to be written next. The unused address register (UAR) is a storage address indicating a first address (having the smallest number) of unused virtual storage addresses in the same bank, to which data have never been written after initialization.

In the present embodiment, when frame data is written, virtual storage addresses are basically used in order from an address having the smallest number in each bank. A virtual storage address that is in an empty state after frame data is read out is reused with priority over an unused virtual storage address. Note that an order of virtual storage addresses to be reused is not limited to the order from the smallest number, and may be any order such as an order in which a virtual storage address that is most recently in an empty state is first reused, and another virtual storage address is reused sequentially.

The address queue management memory (QM) 33B has a function of storing a subsequent virtual address ADD (ADDress) and a pointer PN (Pointer of QM) for each virtual storage address ADM.

FIG. 4 illustrates a storage example of the address queue management memory. In the example, the ADD is a virtual storage address (including bank information) in which communication data subsequent to communication data written to the virtual storage address is stored. The PN is information (end-of-frame flag: EoF) indicating whether or not data stored in the virtual storage address contains final data of frame data.

The queue start address register (SAR) 33C has a function of storing a queue start address SAR (Start Address register of PM) for each queue.

The queue last address register (LAR) 33D has a function of storing a queue last address LAR (Last Address register of PM) for each queue.

FIG. 5 illustrates a storage example of the queue start address register and the queue last address register. Here, the SAR and the LAR are stored for each queue ID (queue number) for identifying a queue. In the example, the SAR is address information (including bank information) indicating a start of a virtual storage address to which frame data of the queue is written. The LAR is address information (including bank information) indicating a last of a virtual storage address to which frame data of the queue is written.

The access history register (AAR) 33E records, as AAR_1, a virtual storage address (including bank information) that was subjected to a writing instruction or reading instruction last. AAR_n is updated to a value of AAR_(n−1) when the AAR_1 is updated (n is an integer of 2 or greater). In other words, a history of writing instructions or reading instructions for the latest n times is displayed.

The working address register (TMPV, TMPL, TMPS) 33F has a function of storing, in common to queues, a working next writing address TMPV (Temporary register for VAR), a working queue last address TMPL (Temporary register for LAR), and a working queue start address TMPS (Temporary register for SAR).

Of these, the TMPV is address information (including bank information) indicating an immediately preceding next writing address VAR (before updating) in a bank to and from which data is written and read. The TMPL is a queue last address LAR immediately before (before updating) a queue into which data is written. The TMPS is address information (including bank information) indicating a queue start address SAR immediately before (before updating) a queue from which data is read. These are used to temporarily retain address information in relation to processing procedures of operations of writing and reading data, but may also be used for the next writing and reading operations.

The active flag register (AFR) 33G has a function of storing, in common to queues, an active flag AFR for each bank. An active flag register (AFR) is a flag for each bank indicating that a row address of the VAR is in an activated state. In a bank to and from which data is written and read, if a row address to and from which data is written and read and a row address of an updated write pointer corresponding to an updated VAR are the same, the row address of the updated VAR is already in an activated state, and thus, the updated active flag AFR is set to a value indicating an activated state. If the row addresses are different from each other, the row address of the updated VAR is in a deactivated state, and thus, the updated active flag AFR is set to a value indicating a deactivated state.

The writing control unit 34 has a function of selecting, in response to a writing instruction from the access arbitration unit 37, based on the access history register (AAR) and the VAR, UAR, and AFR for each bank, a VAR of an optimal bank by performing the following optimal bank selection processing, and outputting, to the DRAM access unit 32, a DRAM writing instruction for instructing writing of frame data, in which a virtual storage address (TMPV) is designated.

Figure 6:
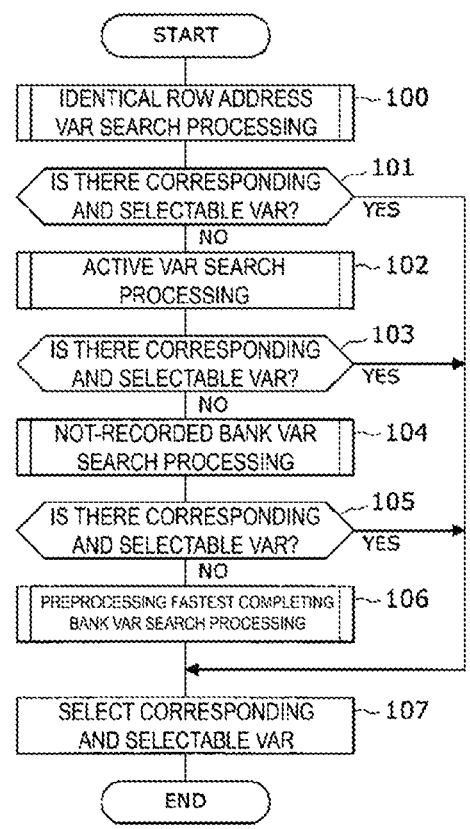
FIG. 6 is a flowchart illustrating optimal bank selection processing.

FIG. 6 is a flowchart illustrating optimal bank selection processing. A bank (VAR) is selected, for example, according to a procedure illustrated in FIG. 6.

The writing control unit 34 uses the AAR to manage which row address is activated in each bank in which access history remains. The writing control unit 34 uses the AFR for each bank to manage whether or not a row address of the VAR in each bank is in an activated state.

The writing control unit 34 selects, with reference to these AAR and AFR, an activated row address from among row addresses of the VAR in each bank. However, if both of the UAR and the VAR of the bank reach an upper limit of a memory capacity for each bank, the bank is full and data cannot be written into the bank, and thus, the bank is not selected.

Note that if a time required from activation processing to a writing or reading operation is n_min times the minimum input interval of write and reading instructions, it is necessary to hold an AAR value for at least the latest n_min times. Thus, the AAR history number n is the number equal to or greater than n_min. In the explanatory diagrams of FIGS. 15 to 21 described later, a case where n=n_min=5 is described in an example. In banks not recorded in any of access histories AAR_1 to AAR_(n_min), preprocessing has already been completed and next activation processing can be immediately started, and thus, writing can be performed at the minimum interval (without deterioration in throughput) from an immediately preceding writing or reading. On the other hand, in banks recorded in any of the AAR_1 to AAR_(n_min), next activation processing cannot be started until on-going preprocessing is completed, and thus, throughput is deteriorated due to waiting for completion of the preprocessing.

Figure 7:
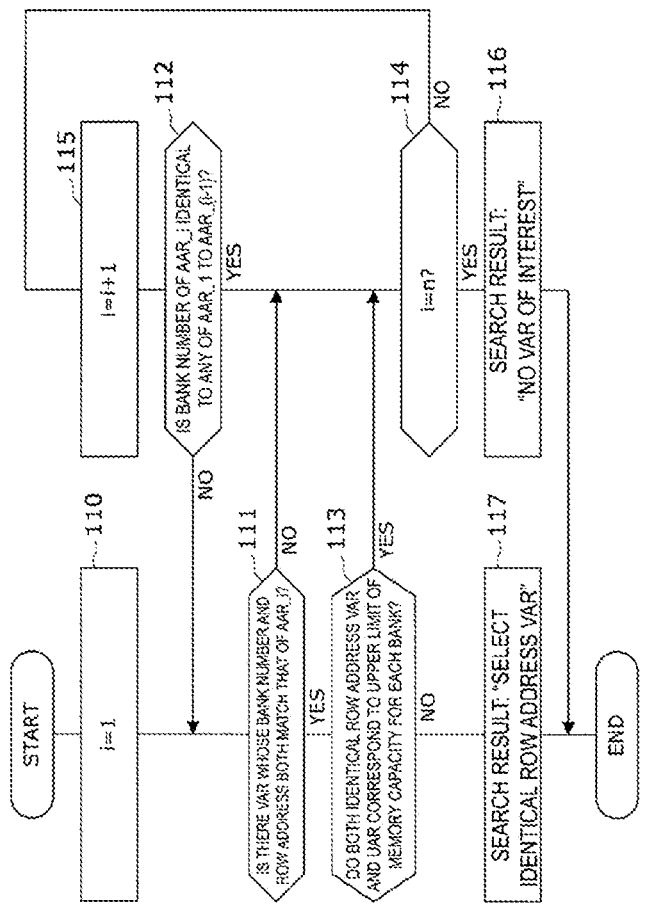
FIG. 7 is a flowchart illustrating identical row address VAR search processing.

For example, as illustrated in FIG. 6, the writing control unit 34 first performs identical row address VAR search processing in FIG. 7 described later, to search a VAR that is selectable and has a row address identical to that in the latest access history of the same bank recorded in the access histories AAR_1 to AAR_n, from among banks (step 100).

Here, if there is a VAR that is selectable and is of a bank corresponding to search conditions (step 101: YES), the row address of the VAR is activated, and thus, the VAR is selected (step 107), and a series of optimal bank selection processing is ended. If a write destination is decided by the identical row address VAR search processing, the row address of the write destination has already been activated, and thus, the activation processing is not needed and throughput does not deteriorate. In addition, a VAR whose row address is accessed immediately before can be searched within a range where the access history remains, and thus, a continuous writing to the identical row address of the identical bank can be preferentially selected.

On the other hand, if there is no VAR that is selectable and has a row address identical to that in the latest access history of the same bank recorded in the AAR_1 to AAR_n (step 101: NO), the writing control unit 34 performs active VAR search processing in FIG. 8 described later, to search a VAR of a bank whose AFR indicates an activated state, from among banks (step 102).

Here, if there is a VAR that is selectable and is of a bank corresponding to search conditions (step 103: YES), the row address of the VAR is activated, and thus, the VAR is selected (step 107), and a series of optimal bank selection processing is ended. If a write destination is decided by the active VAR search processing, the row address of the write destination has already been activated, and thus, the activation processing is not needed and throughput does not deteriorate. In addition, even if the access history does not remain, if there is a VAR whose row address is activated, a VAR can be reliably searched.

On the other hand, if there is no VAR that is selectable and is of a bank whose AFR indicates an activated state (step 103: NO), the writing control unit 34 performs not-recorded bank VAR search processing of FIG. 9 described later, to search a VAR of a bank with no record that is not recorded in any of the access histories AAR_1 to AAR_(n_min) of the AAR, from among banks (step 104).

Here, if there is a VAR that is selectable and is of a bank corresponding to search conditions (step 105: YES), the VAR is selected (step 107), and a series of optimal bank selection processing is ended. If a write destination is decided by the not-recorded bank VAR search processing, the activation processing can be immediately started, and therefore, throughput does not deteriorate, but the activation processing is needed.

On the other hand, if there is no VAR that is selectable and is of a bank with no record (step 105: NO), the writing control unit 34 performs preprocessing fastest completing bank VAR search processing of FIG. 10 described later, to search a VAR of a bank whose latest access history of the same bank recorded in the access histories AAR_1 to AAR_n of the AAR is the oldest in all banks, from among banks (step 106), select the searched VAR (step 107), and a series of optimal bank selection processing is ended. If a write destination is not decided before the not-recorded bank VAR search processing, the activation processing and throughput deterioration are inevitable. In the preprocessing fastest completing bank VAR search processing, if a VAR on which the activation processing can be started earliest is searched, throughput deterioration can be reduced as much as possible.

Note that in FIG. 6, step boo and step 102 are both processing for searching a VAR whose row address is activated, and thus, have a similar effect in that power consumption due to the activation processing can be reduced. For this reason, steps 100 and 101 may be omitted.

Next, the identical row address VAR search processing performed in step 100 of FIG. 6 will be described with reference to FIG. 7. FIG. 7 is a flowchart illustrating the identical row address VAR search processing.

First, the writing control unit 34 sets "1" to an AAR selection parameter i, selects AAR_1 as AAR_i to be processed (step no), and searches a VAR whose bank number and row address both match those of AAR_i, from among VARs in banks (step 111). Here, the smaller the parameter i is, the newer the access history AAR_i is.

In step 111, if there is a VAR satisfying such a condition (step 111: YES), the writing control unit 34 determines whether both of the identical row addresses VAR and UAR correspond to an upper limit of a memory capacity for each bank (step 113).

In step 113, if both of the identical row addresses VAR and UAR do not correspond to the upper limit (step 113: NO), the writing control unit 34 selects, as a search result, the identical row address VAR searched in step 111 (step 117), and a series of identical row address VAR search processing is ended.

On the other hand, in each of a case where there is no corresponding VAR (step 111: NO) in step 111 and a case where both of the identical row addresses VAR and UAR correspond to the upper limit (step 113: YES) in step 113, the writing control unit 34 compares i and the AAR history number n to check if a search for all AAR_i is completed (step 114), and if there is an unsearched AAR_i (step 114:

NO), increments i (i=i+1) (step 115) and thereafter determines if a bank number of the AAR_i matches any one of the previously selected AAR_1 to AAR_(i−1) (step 112).

In step 112, if there is no matching bank number (step 112: NO), the writing control unit 34 returns to step 111.

If there is a matching bank number (step 112: YES) in step 112, the writing control unit 34 proceeds to step 114, and if there is an unsearched AAR_i (step 114: NO), increments i (i=i+1) (step 115) and thereafter returns to step 112.

In step 114, if a search for all AAR_i is completed (step 114: YES), the writing control unit 34 selects, as a search result, that there is no VAR of interest (step 116), and a series of identical row address VAR search processing is ended.

Figure 8:
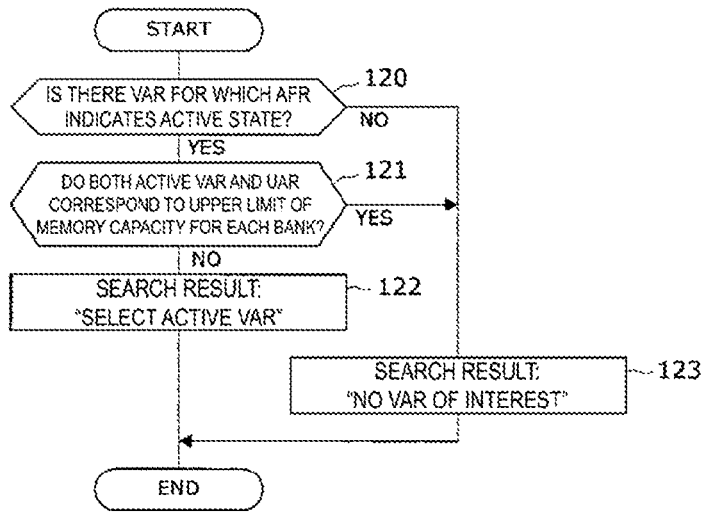
FIG. 8 is a flowchart illustrating active VAR search processing.

Next, the active VAR search processing performed in step 102 of FIG. 6 will be described with reference to FIG. 8. FIG. 8 is a flowchart illustrating the active VAR search processing.

First, the writing control unit 34 refers to the AFR of each bank to search a bank indicating an active state (step 120), and if there is a bank in an active state (step 120: YES), determines if both of the active state VAR and UAR correspond to an upper limit of a memory capacity for each bank (step 121).

In step 121, if both of the active state VAR and UAR do not correspond to the upper limit (step 121: NO), the writing control unit 34 selects, as a search result, the active state VAR searched in step 120 (step 122), and a series of active VAR search processing is ended.

On the other hand, in each of a case where there is no bank in an active state (step 120: NO) in step 120 and a case where both of the active state VAR and UAR correspond to the upper limit (step 121: YES) in step 121, the writing control unit 34 selects, as a search result, that there is no VAR of interest (step 123), and a series of active VAR search processing is ended.

Figure 9:
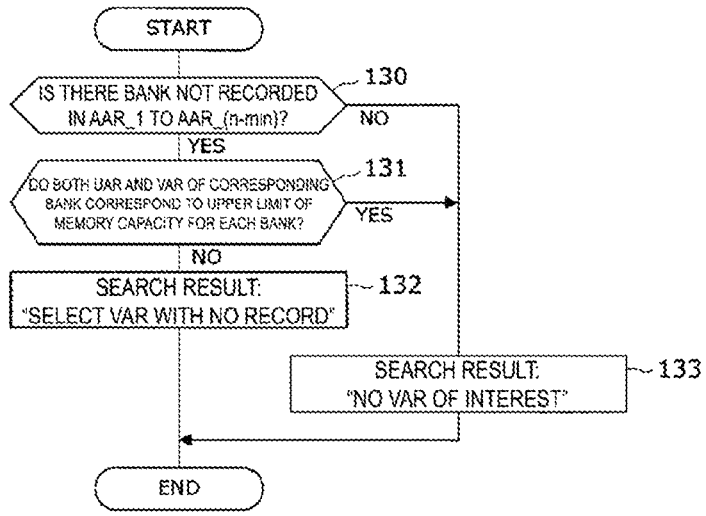
FIG. 9 is a flowchart illustrating not-recorded bank VAR search processing.

Next, the not-recorded bank VAR search processing performed in step 104 of FIG. 6 will be described with reference to FIG. 9. FIG. 9 is a flowchart illustrating the not-recorded bank VAR search processing.

First, the writing control unit 34 refers to the access history of the AAR to search a bank that is not recorded in any of the AAR_1 to AAR_(n_min) (step 130). If there is a bank with no record (step 130: YES), the writing control unit 34 determines if both of the UAR and the VAR of the bank correspond to the upper limit of the memory capacity for each bank (step 131).

In step 131, if both of the UAR and the VAR of the bank does not correspond to the upper limit (step 131: NO), the writing control unit 34 selects, as a search result, the VAR of the bank with no record searched in step 130 (step 132), and ends a series of not-recorded bank VAR search processing.

On the other hand, in each of a case where there is no bank with no record (step 130: NO) in step 130 and a case if both of the UAR and the VAR of the bank correspond to the upper limit (step 131: YES) in step 131, the writing control unit 34 selects, as a search result, that there is no VAR of interest (step 133), and a series of not-recorded bank VAR search processing is ended.

Figures 10, 11:
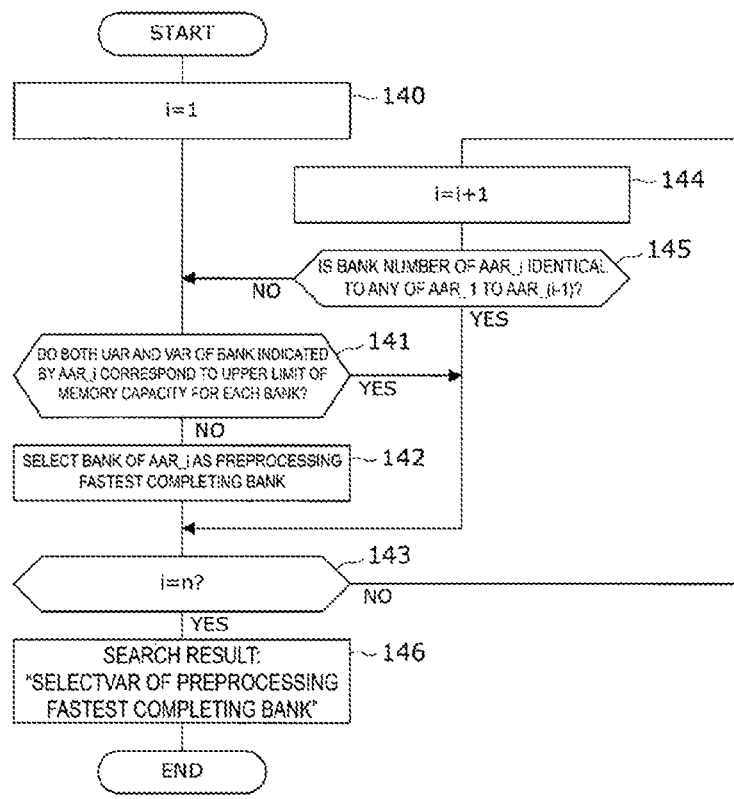
FIG. 10 is a flowchart illustrating preprocessing fastest completing bank VAR search processing.
FIG. 11 illustrates a storage example of a queue-using address number memory.

Next, the preprocessing fastest completing bank VAR search processing performed in step 106 of FIG. 6 will be described with reference to FIG. 10. FIG. 10 is a flowchart illustrating the preprocessing fastest completing bank VAR search processing.

First, the writing control unit 34 sets "1" for an AAR selection parameter i, selects AAR_1 as AAR_i to be processed (step 140), and searches a VAR whose bank number and row address both match those of AAR_i, from among VARs in each bank (step 141).

In step 141, if there is no corresponding VAR (step 141: NO), the writing control unit 34 selects a bank of the AAR_i searched in step 141 as a bank in which the preprocessing is completed fastest (step 142).

Then, the writing control unit 34 compares i and the AAR history number n to check if a search for all AAR_i is completed (step 143), and if there is an unsearched AAR_i (step 143: NO), increments i (i=i+1) (step 144) and thereafter determines if a bank number of the AAR_i matches any one of the previously selected AAR_1 to AAR_(i−1) (step 145).

In step 145, if there is no matching bank number (step 145: NO), the procedure proceeds to step 141. If there is a matching bank number (step 145: YES), the procedure proceeds to step 143.

Note that in step 141, if there is a corresponding VAR (step 141: YES), the procedure also proceeds to step 143.

In step 143, if the search for all AAR_i is completed (step 143: YES), the writing control unit 34 selects, as a search result, the VAR of a preprocessing fastest completing bank selected finally in step 142 (step 146), and a series of preprocessing fastest completing bank VAR search processing is ended.

The reading control unit 35 has a function of outputting, in response to a reading instruction from the access arbitration unit 37, based on the queue control information of the queue control memory 33, a DRAM reading instruction indicating reading of start data from a read-target queue, in which a virtual storage address (SAR) is designated, to the DRAM access unit 32. The reading control unit 35 also has a function of transferring, to the demultiplexer 20, data read from the read-target queue via the DRAM access unit 32 along with a frame end flag and the queue designation information.

The queue-using address number memory 36 is composed of a semiconductor memory such as an SRAM chip, and has a function of storing, for each queue, the number of virtual addresses NK used by frame data accumulated in the queue, and a function of outputting, in response to a request from the demultiplexer 20 and the access arbitration unit 37, the number of virtual addresses NK of the designated queue.

FIG. 11 is a storage example of the queue-using address number memory. Here, the number of virtual addresses NK of a queue is stored for each queue ID (queue number) for identifying the queue.

The access arbitration unit 37 has a function of receiving frame data transferred from the multiplexer 10, and calculating, based on frame length information added to the frame data, the number of writing times by dividing the frame data into a plurality of items of data D in accordance with a data size for one virtual address. The access arbitration unit 37 also has a function of outputting, to the writing control unit 34, a writing instruction, for each data D, instructing writing into a write-target queue designated by the queue designation information added to the frame data, for the number of writing times. The access arbitration unit 37 also has a function of adding the number of virtual addresses that is increased due to writing of the frame data to the number of virtual addresses NK of the write-target queue in the queue-using address number memory 36.

The access arbitration unit 37 also has a function of calculating, in response to a reading request from the demultiplexer 20, the number of times of reading by dividing a data amount designated by the read data amount information of the reading request in accordance with a data size for one virtual address. Furthermore, the access arbitration unit 37 has three functions described below. The first function is to output, to the reading control unit 35, a reading instruction for instructing reading of frame data from the read-target queue designated by the queue designation information of the reading request, for the number of times of reading. The second function is to subtract the number of virtual addresses that is reduced due to reading of the frame data from the number of virtual addresses NK of the write-target queue in the queue-using address number memory 36. The third function is to arbitrate contention to writing of frame data and output a reading instruction at a readable timing.

DRAM Access Unit

Figure 12:
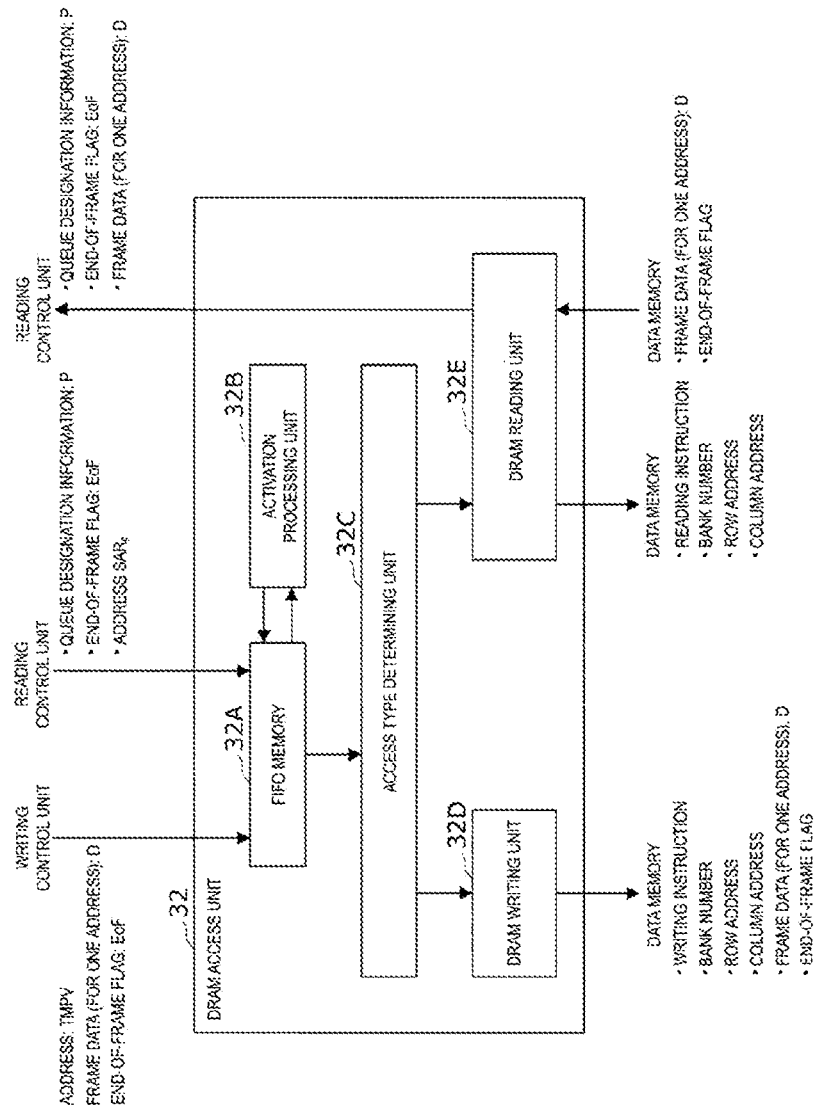
FIG. 12 is a block diagram illustrating a configuration of a DRAM access unit according to the first embodiment.

Next, the DRAM access unit 32 employed in the recording device 30 according to the present embodiment will be described with reference to FIG. 12. FIG. 12 is a block diagram illustrating a configuration of the DRAM access unit according to the first embodiment.

The DRAM access unit 32 includes, as main circuit units, a FIFO memory 32A, an activation processing unit 32B, an access type determining unit 32C, a DRAM writing unit 32D, and a DRAM reading unit 32E.

The FIFO memory 32A is composed of a general FIFO memory and has a function of accumulating instructions so that a DRAM writing instruction from the writing control unit 34 and a DRAM reading instruction from the reading control unit 35 are intermixed, and a function of reading the accumulated DRAM writing instructions and DRAM reading instructions in an input order to output the instructions to the access type determining unit 32C after a row address is activated by the activation processing unit 32B. At this time, as information for access type determination, information indicating whether the instruction is a DRAM writing instruction from the writing control unit 34 or a DRAM reading instruction from the reading control unit 35 may be written into the FIFO memory 32A together with each of the instructions, and the information may also be output to the access type determining unit 32C.

Note that when the access arbitration unit 37 illustrated in FIG. 24 described later is used, a DRAM writing instruction from the writing control unit 34 and a DRAM reading instruction from the reading control unit 35 are not to be input at the same time; however, if these instructions are input at the same time, writing for a DRAM writing instruction to the FIFO memory 32A may be prioritized and writing for a DRAM read indication to the FIFO memory 32A may be made to wait.

If the DRAM writing instructions are accumulated in the FIFO memory 32A, and if the write-target row address is not in an activated state, the activation processing unit 32B has a function of activating the write-target row address.

If the DRAM reading instructions are accumulated in the FIFO memory 32A, and if a read-target row address designated by the DRAM reading instruction is not in an activated state in the read-target bank, the activation processing unit 32B has a function of activating the read-target row address in the read-target bank. In addition, when the DRAM reading instructions are accumulated in the FIFO memory 32A, and if a row address different from the read-target row address is in an activated state in the read-target bank, the activation processing unit 32B has a function of activating the read-target row address in response to completion of access to the row address.

The access type determining unit 32C has a function of distributing and outputting the DRAM writing instructions output from the FIFO memory 32A to the DRAM writing unit 32D, and a function of distributing and outputting the DRAM reading instructions output from the FIFO memory 32A to the DRAM reading unit 32E.

The DRAM writing unit 32D has a function of writing frame data (data D) designated by the DRAM writing instruction to an indicated column address, based on a combination of the write-target row address and the write-target bank in the input DRAM writing instruction.

At this time, if a plurality of column addresses are required to write frame data (data D) for one storage address, a burst mode which is a function of the DRAM may be used to write the frame data into continuous column addresses, as a result of which a time required for writing the frame data can be shortened.

In addition, if an EoF value (PN) is written into the data memory 31, the EoF value (PN) may be written simultaneously with writing of frame data.

The DRAM reading unit 32E has a function of reading, based on a combination of the read-target row address and the read-target bank in the input DRAM reading instruction, frame data (data D) from an indicated column address from among the read-target row addresses of the read-target bank, and outputting the frame data (data D) along with the queue designation information, to the reading control unit 35.

At this time, if a plurality of column addresses are required to read frame data (data D) for one virtual storage address, a burst mode which is a function of the DRAM may be used to read the framed data from continuous column addresses, as a result of which a time required for reading the frame data can be shortened.

In addition, if the EoF value (PN) is written into the data memory 31, the EoF value may be read simultaneously with reading of frame data.

The read EoF value may be output to the reading control unit 35 along with the frame data and the queue designation information. Note that if the EoF value is not to be written into the data memory 31, the EoF value may be written into the address queue management memory (QM) 33B. The reading control unit 35 may output the EoF value along with the queue designation information to the DRAM access unit 32, and the DRAM reading unit 32E may output the EoF value received via the access type determining unit 32C to the reading control unit 35 along with the frame data read from the data memory 31.

Operations in First Embodiment

Next, operations of the recording device 30 employed in the communication input/output apparatus 1 according to the present embodiment will be described with reference to FIGS. 13 and 14.

Figure 13:
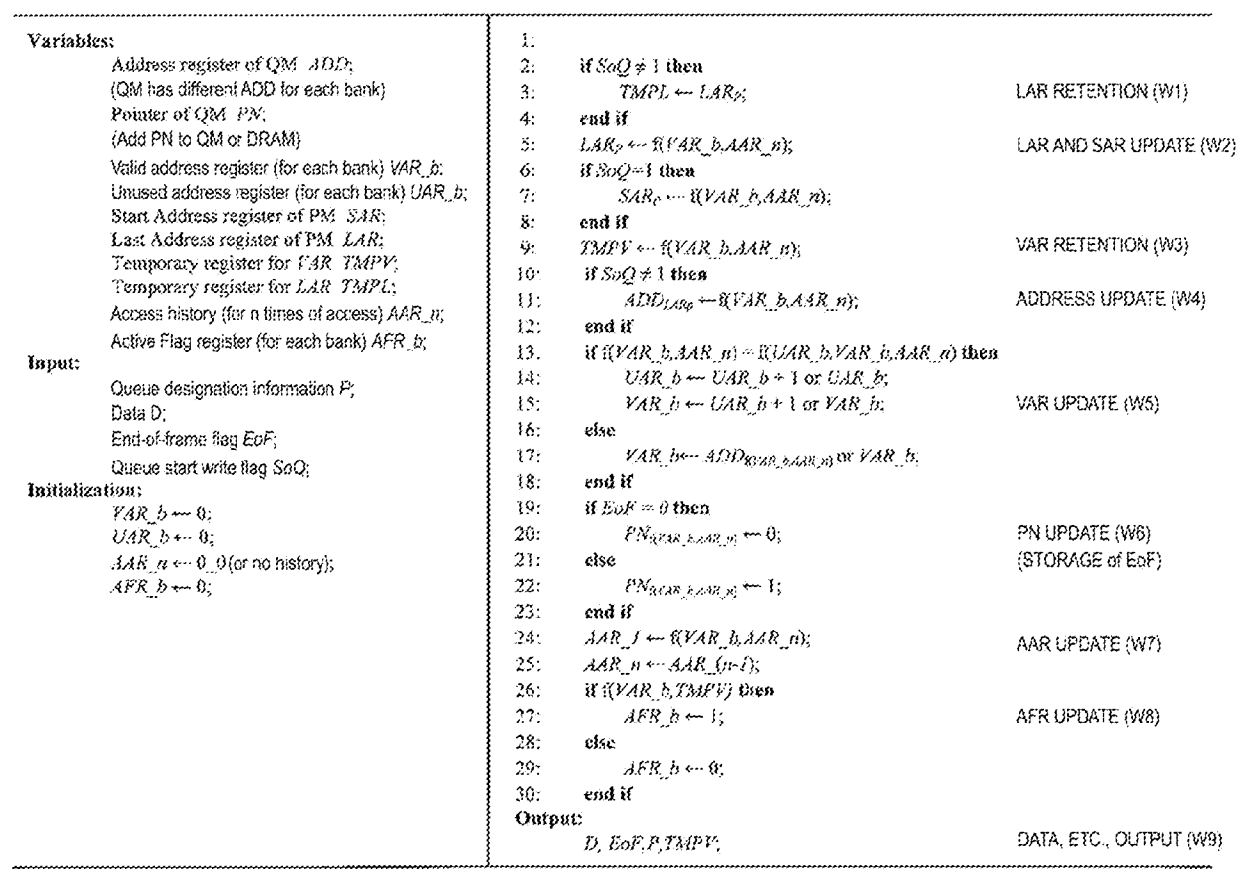

FIG. 13 is an explanatory diagram illustrating a writing operation in the writing control unit. FIG. 14 is an explanatory diagram illustrating a reading operation in the reading control unit.

Writing Operation

First, a writing operation in the writing control unit 34 of the recording device 30 will be described with reference to FIG. 13.

The writing control unit 34 performs a processing operation of FIG. 13 in response to a writing instruction from the access arbitration unit 37. If new data is written into a write-target queue, from a point of view of sharing a storage address of the data memory 31 by queues, a main change in queue control information before and after writing the data occurs in the queue last address LAR for the write-target queue, the subsequent virtual address ADD for the queue last address before the data is written, the next writing address VAR common to each of the queues (only VAR of a selected bank), the access history register (AAR), and the active flag register (AFR). Note that if the writing is a first writing into the write-target queue, the queue start address SAR for the write-target queue is also changed.

Thus, in the processing operation of FIG. 13, the writing control unit 34 writes designated data to the next writing address VAR of the selected bank (outputs a writing instruction), updates the queue last address LAR for the write-target queue, updates the subsequent virtual address ADD for the queue last address before the data is written, updates the next writing address VAR common to each of the queues (only VAR of the selected bank), and updates the active flag AFR common to each of the queues (only AFR of the selected bank). Note that if the writing is a first writing into the write-target queue, the queue start address for the write-target queue is also updated. Details of these updates will be described later based on operational examples.

At this time, the writing control unit 34 performs steps W1 to W9 illustrated in FIG. 13 by accessing the queue control memory 33. That is, the processing is performed in order of LAR retention (W1), LAR and SAR update (W2), VAR retention (W3), ADD update (W4), VAR update (W5), PN update (W6), AAR update (W7), AFR update (W8), and data, etc. output (W9). Note that a processing order in FIG. 8 takes into account processing efficiency, but another processing order may be applied.

Reading Operation

Next, a reading operation in the reading control unit 35 of the recording device 30 will be described with reference to FIG. 14.

The reading control unit 35 performs a processing operation in FIG. 14 in response to a reading instruction from the access arbitration unit 37. If new data is read from a read-target queue, from a point of view of sharing a storage address of the data memory 31 by queues, a main change in queue control information before and after reading the data occurs in the queue start address SAR for the read-target queue, the next writing address VAR common to each of the queues (only VAR of the read-target bank), the subsequent virtual address ADD for the new next writing address VAR (only VAR of the read-target bank), the access history register (AAR), and the active flag AFR common to each of the queues (only AFR of the read-target bank).

Thus, in the processing operation in FIG. 14, the reading control unit 35 reads an End of Frame (EoF: end-of-frame flag) for the queue start address SAR for the read-target queue, updates the queue start address SAR for the r, updates the next writing address VAR common to each of the queues (only VAR of the read-target bank), updates the subsequent virtual address ADD for the read virtual storage address, updates the active flag AFR common to each of the queues (only AFR of the read-target bank), and outputs a reading instruction. Details of these updates will be described later based on operational examples.

At this time, the reading control unit 35 performs steps R1 to R8 illustrated in FIG. 14 by accessing the queue control memory 33. That is, the processing is performed in order of EoF output (R1), VAR retention (R2), SAR retention (R3), VAR update (R4), SAR update (R5), subsequent virtual address update (R6), AAR update (R7), AFR update (R8), and reading instruction output. Note that a processing order in FIG. 9 takes into account processing efficiency, but another processing order may be applied.

Operational Examples

Next, operations of writing and reading frame data in the recording device 30 will be described with reference to FIGS. 15 to 21, and in an example, a case where data items P2-3 and P2-4 are written into the queue P2, then data items P1-1 to P1-5 are read from the queue P1, and data P1-6 is written into the queue P1.

Note that in the operation examples, it is assumed that virtual storage addresses "0 to 7" belong to a row address "0", virtual storage addresses "8 to 15" belong to a row address "1", and in a similar manner, virtual storage addresses "8×i+0 to 8×i+7" belong to a row address "i". In addition, writing and reading of which history is not remained in the access history registers AAR_1 to AAR_5 are considered to be already completed.

Operational Examples: Immediately Before Data P2-3 is Written

Figure 15:
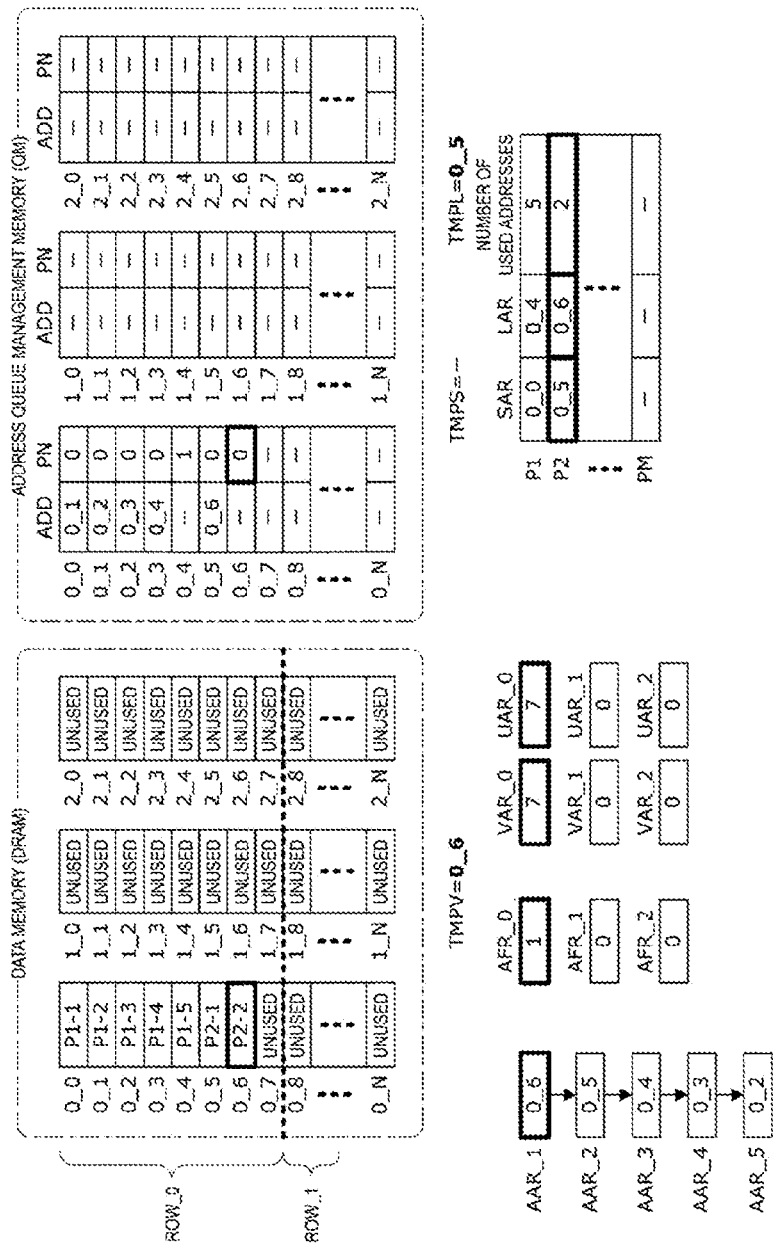
FIG. 15 is an explanatory diagram illustrating queue control information immediately before data P2-3 is written (immediately after data P2-2 is written).

FIG. 15 is an explanatory diagram illustrating the queue control information immediately before data P2-3 is written (immediately after data P2-2 is written). Here, the queue control information immediately before the data P2-3 is written, i.e., immediately after the data P2-2 is written is illustrated. In this state, of the virtual data memory, data items P1-1 to P1-5 of a queue P1 are written to virtual storage addresses "0 to 4" of a bank 0, and data items P2-1 and P2-2 of a queue P2 are written to virtual storage addresses "5 and 6" of the bank 0. Virtual storage addresses "7 to N" of the bank 0, a bank 1, and a bank 2 are unused.

Thus, a next writing address VAR of the bank 0 is "7", and an unused address UAR of the bank 0 is also "7". Furthermore, in accordance with an order of the data items P1-1 to P1-5 of the queue P1, subsequent virtual addresses ADDs for the virtual storage addresses "0, 1, 2, and 3" of the bank 0 are "1, 2, 3, and 4" of the bank 0. In accordance with an order of the data items P2-1 and P2-2 of the queue P2, a subsequent virtual address ADD for the virtual storage address "5" of the bank 0 is "6" of the bank 0.

Note that the pointers PNs of the virtual storage addresses "0 to 3" of the bank 0 are "0", and the pointer PN of the virtual storage address "4" is "1", and thus, it can be seen that the P1-5 is a frame end in a frame in which the data items P1-1 to P1-5 are continuous. Furthermore, the pointers PNs of the virtual storage addresses "5 and 6" of the bank 0 are "0", and thus, it can be seen that a frame end is not included in the data items P2-1 and P2-2.

Note that the next writing address VAR and the unused address UAR of the bank 1 and the bank 2 are both 0 of an initial value. Any value is invalid even if stored in the ADDs and the PNs for the virtual storage addresses "7 to N" of the bank 0, the bank 1, and the bank 2 that are unused, and therefore "-" is indicated in the drawing.

Regarding the queue P1, the queue start address SAR indicates the virtual storage address of the data P1-1 "0 of bank 0", and the queue last address LAR indicates the virtual storage address of the data P1-5 "4 of bank 0". Regarding the queue P2, the queue start address SAR indicates the virtual storage address of the data P2-1 "5 of bank 0", and the queue last address LAR indicates the virtual storage address of the data P2-2 "6 of bank 0". Note that "6 of bank 0" and "5 of bank 0" are stored in the working next writing address TMPV and the working queue last address TMPL, respectively.

Furthermore, the row address of the write-target virtual address "6" of the bank 0 is "0", and the row address of the updated VAR "7" of the bank 0 is "0", that is, the row addresses are the same, and thus the active flag AFR of the bank 0 is "1" indicating an activated state. Note that the write-target virtual address is stored in the working next writing address TMPV. The bank 1 and the bank 2 are unused, and thus, the AFR is not updated from the initial setting, and is set to "0" indicating a deactivated state.

In addition, the virtual storage addresses "6 of bank 0" to "2 of bank 0", for which a writing instruction is made, are recorded in order from the newest in the access history registers AAR_1 to AAR_5.

Operational Examples: Writing of Data P2-3

Figure 16:
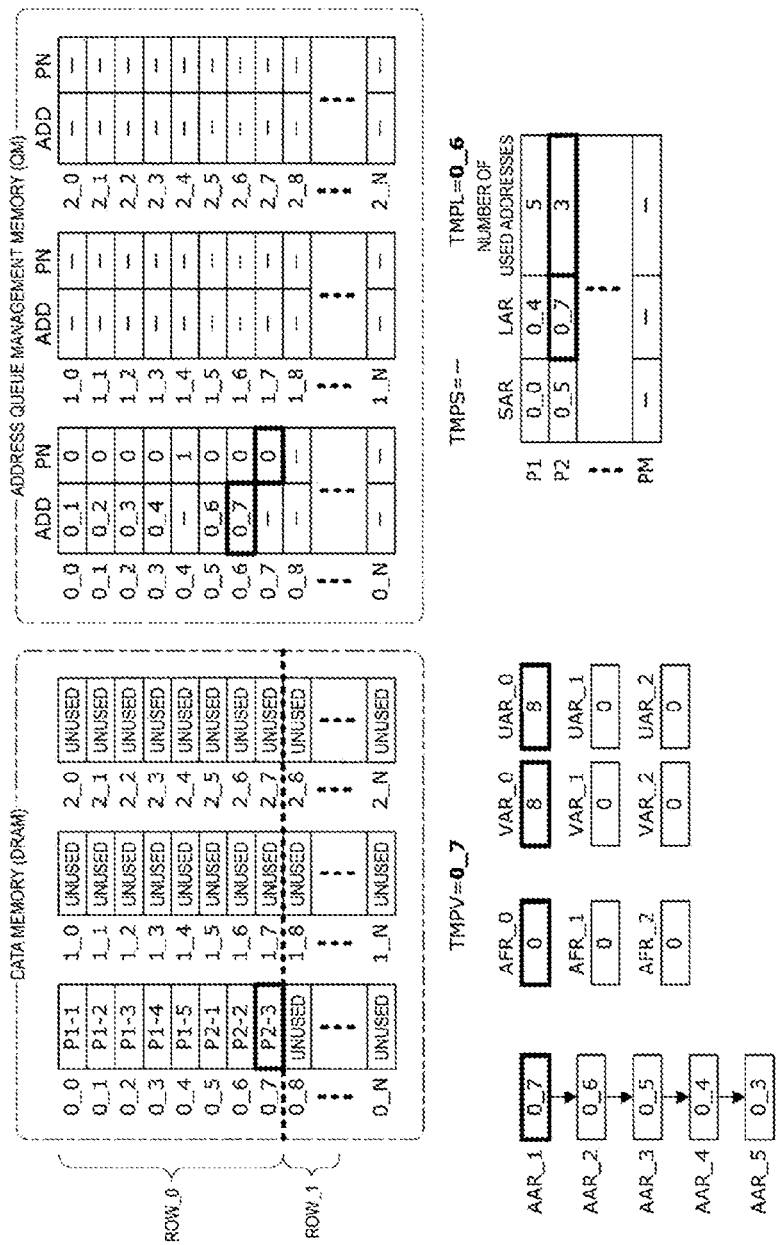
FIG. 16 is an explanatory diagram illustrating a change in the queue control information when the data P2-3 is written.

In the state illustrated in FIG. 15, if the data P2-3 of the queue P2 is written, the queue control information changes as in FIG. 16. FIG. 16 is an explanatory diagram illustrating a change in the queue control information when the data P2-3 is written.

First, a write-target bank is selected.

Initially, the AAR and the VAR are compared to search a bank in which the row address of the VAR is activated (identical row address VAR search processing). In the state of FIG. 15, the virtual address recorded in the AAR is only "2 to 6" of the bank 0, and in this case, only the row address "0" of the bank 0 is activated. The VAR of the bank 0 is "7", and in this case, the row address is "0", and thus, is in an activated state. Thus, the bank 0 is selected. As a result, the data is written without the activation processing, which not only can suppress deterioration in effective throughput but also can reduce power consumption due to the activation processing.

Prior to updating a management memory, a value "7 of bank 0" of the VAR of the selected bank 0 is stored in the working next writing address TMPV, and a value "6 of bank 0" of the LAR of the queue P2 is stored in the working queue last address TMPL.

Next, the management memory is updated.

The data P2-3 is written to the write-target virtual address "7" indicated by the next writing address VAR of the bank 0, and thus, P2-3 is new final data of the queue P2. Then, a queue final position is changed from the virtual storage address "6 of bank 0" to "7 of bank 0", and thus, the queue last address LAR of the queue P2 is updated from "6 of bank 0" to "7 of bank 0".

In addition, P2-3 is to be subsequent to P2-2 which was the queue final data before the data is written, and thus, the virtual storage address of P2-3 "7 of bank 0" is set as the virtual address ADD subsequent to the virtual storage address of P2-2 "6 of bank 0". Note that the virtual storage address of P2-2 is stored in the working queue last address TMPL, and the virtual storage address of P2-3 is stored in the working next writing address TMPV, respectively. P2-3 is not the frame end, and thus, "0" is set to the pointer PN of the virtual storage address of P2-3 "7 of bank 0".

In addition, P2-3 is written to the write-target virtual address "7" indicated by the next writing address VAR (for the bank 0) before the data is written, and thus, the next writing address VAR of the bank 0 is updated from "7" to "8". Note that the UAR of the bank 0 is also updated from "7" to "8", but the VARs and the UARs of the bank 1 and the bank 2 are not updated.

Furthermore, the row address of the write-target virtual address "7" of the bank 0 is "0", and the row address of the updated VAR "8" of the bank 0 is "1", that is, the row addresses are different from each other, and thus the active flag AFR of the bank 0 is set to "0". Note that the write-target virtual address is stored in the working next writing address TMPV. The VARs of the bank 1 and the bank 2 are not updated, and thus, the AFRs are not updated.

In addition, the access history registers AAR_2 to AAR_5 are updated with values of AAR_1 to AAR_4, respectively, and the virtual storage address "7 of bank 0", for which a writing instruction is made at the last, is recorded in AAR_1.

Operational Examples: Writing of Data P2-4

Figure 17:
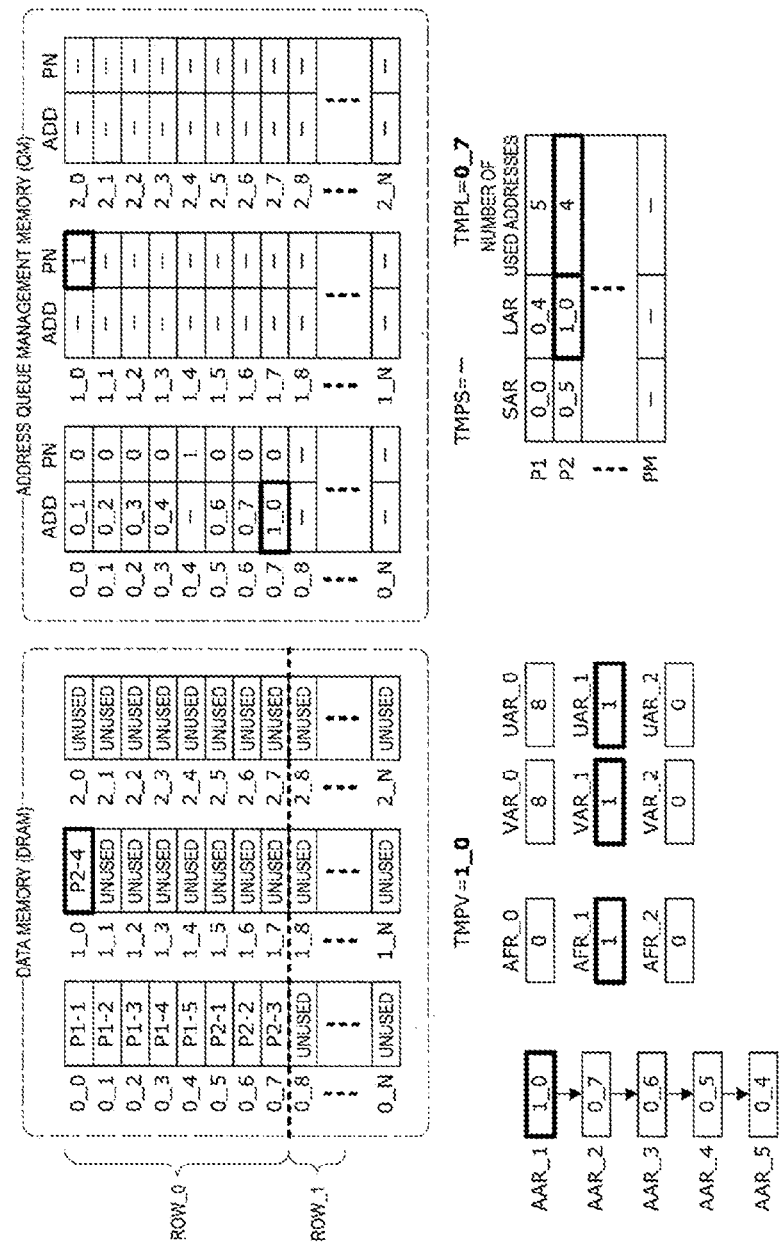
FIG. 17 is an explanatory diagram illustrating a change in the queue control information when data P2-4 is written.

In the state illustrated in FIG. 16, if the data P2-4 of the queue P2 is written, the queue control information changes as in FIG. 17. FIG. 17 is an explanatory diagram illustrating a change in the queue control information when the data P2-4 is written.

First, a write-target bank is selected.

Initially, the AAR and the VAR are compared to search a bank in which the row address of the VAR is activated (identical row address VAR search processing). In the state of FIG. 16, the virtual address recorded in the AAR is only "3 to 7" of the bank 0, and in this case, only the row address "0" of the bank 0 is activated. The VAR of the bank 0 is "8", and in this case, the row address is "1" and is thus in a deactivated state. Thus, in order to perform next writing (P2-4) to the bank 0, there is a need to wait until the last writing (P2-3) is completed and then perform the activation processing, and therefore, another bank is selected.

Next, the AFR is referred to search a bank in which the row address of the VAR is activated (active VAR search processing). In this case, the AFRs of all banks indicate "0 (deactivated)", which indicates that there is no bank in which the row address of the VAR is activated.

Next, a bank on which the activation processing can be immediately started is searched (not-recorded bank VAR search processing). In this case, the virtual address is not recorded in the AARs for the bank 1 and the bank 2, and thus, the activation processing can be immediately started. Thus, either one of the bank 1 or the bank 2 is selected (the bank 1 is selected in the example of FIG. 17). As a result, the data is written immediately after the activation processing is performed, which can suppress deterioration in effective throughput, but power is consumed for the activation processing.

Prior to updating the management memory, a value "0 of bank 1" of the VAR of the selected bank 1 is stored in the working next writing address TMPV, and a value "7 of bank 0" of the LAR of the queue P2 is stored in the working queue last address TMPL, respectively.

Next, the management memory is updated.

The data P2-4 is written to the write-target virtual address "0" indicated by the next writing address VAR of the bank 1, and thus, P2-4 is new final data of the queue P2. Then, the queue final position is changed from the virtual storage address "7 of bank 0" to "0 of bank 1", and thus, the queue last address LAR of the queue P2 is updated from "7 of bank 0" to "0 of bank 1".

In addition, P2-4 is to be subsequent to P2-3 that was the queue final data before the data is written, and thus, the virtual storage address of P2-4 "0 of bank 1" is set as the virtual address ADD subsequent to the virtual storage address of P2-3 "7 of bank 0". Note that the virtual storage address of P2-3 is stored in the working queue last address TMPL, and the virtual storage address of P2-4 is stored in the working next writing address TMPV, respectively. P2-4 is the frame end, and thus, "1" is set to the pointer PN of the virtual storage address of P2-4 "0 of bank 1".

In addition, P2-4 is written to the write-target virtual address "0" indicated by the next writing address VAR (for the bank 1) before the data is written, and thus, the next writing address VAR of the bank 1 is updated from "0" to "1". Note that the UAR of the bank 1 is also updated from "0" to "1", but the VARs and the UARs of the bank 0 and the bank 2 are not updated.

Furthermore, the row address of the write-target virtual address "0" of the bank 1 is "0", and the row address of the updated VAR "1" of the bank 1 is "0", that is, the row addresses are the same, and thus the active flag AFR of the bank 1 is set to "1". Note that the write-target virtual address is stored in the working next writing address TMPV. The VARs of the bank 0 and the bank 2 are not updated, and thus, the AFRs are not updated.

In addition, the access history registers AAR_2 to AAR_5 are updated with values of AAR_1 to AAR_4, respectively, and the virtual storage address "0 of bank 1", for which a writing instruction is made at the last, is recorded in AAR_1.

Operational Examples: Reading of Data P1-1

Figure 18:
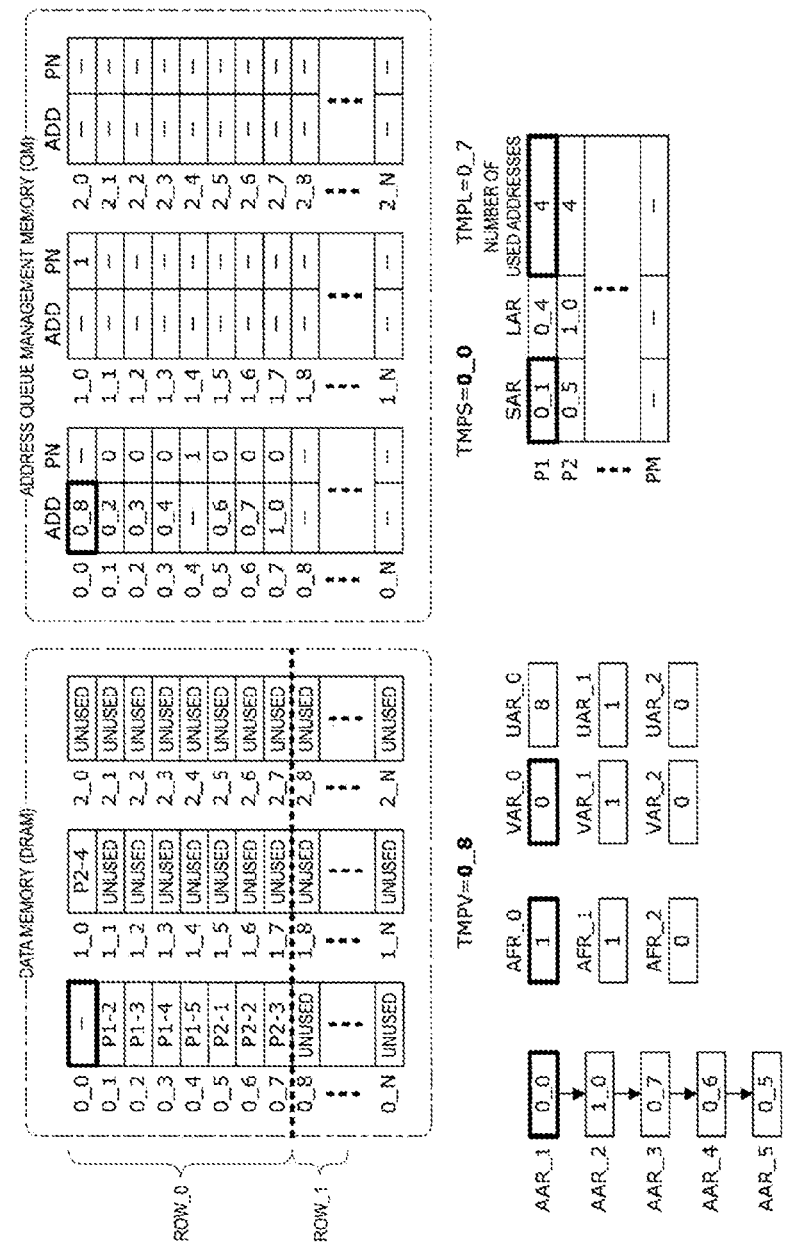
FIG. 18 is an explanatory diagram illustrating a change in the queue control information when data P1-1 is read.

In the state illustrated in FIG. 17, when the data P1-1 of the queue P1 is read, the queue control information changes as in FIG. 18. FIG. 18 is an explanatory diagram illustrating a change in the queue control information when the data P1-1 is read.

First, a read-target bank is searched. In the state of FIG. 17, the read-target virtual address indicated by the queue start address SAR for the queue P1 is "0 of bank 0". Thus, the data P1-1 is read from "0 of bank 0". Note that the pointer PN of the read-target virtual address "0 of bank 0" indicates "0", which shows that P1-1 is not the frame end.

Prior to updating the management memory, a value "8 of bank 0" of the VAR of the read source bank 0 is stored in the working next writing address TMPV, and a value "0 of bank 0" of the SAR of the queue P1 is stored in the working queue start address TMPS, respectively.

Next, the management memory is updated.

The data D of the read-target virtual address "0 of bank 0" is not present, and data for the queue P1 includes four of P1-2 to P1-5. This causes P1-2 to be start data of the queue P1, then a queue start position is changed from the virtual storage address "0 of bank 0" to "1 of bank 0", and thus, the queue start address SAR for the queue P1 is updated from "0 of bank 0" to "1 of bank 0". Note that a new queue start position is stored in the virtual address ADD subsequent to the read-target virtual address "0 of bank 0".

In addition, the data D of the read-target virtual address "0 of bank 0" is not present, and thus, this virtual storage address "0 of bank 0" is a position where next data for the bank 0 is written. Thus, the next writing address VAR for the bank 0 is updated from "8" to "0". In accordance with this, the virtual address "8", which was the next writing address VAR of the bank 0 before the data is read, is to be subsequent to the new next writing address VAR "0", and thus, "8 of bank 0" is set as the virtual address ADD subsequent to the virtual storage address "0 of bank 0". Any value is invalid even if stored in the pointer PN of the read-target virtual address "0 of bank 0" which is in an empty state. Note that the virtual address which was the next writing address VAR before the data is read is stored in the working next writing address TMPV. In a case where the data is read, the UAR of the bank 0 is not updated. The VARs and the UARs of the bank 1 and the bank 2 are also not updated.

Furthermore, the row address of the read-target virtual address "0" of the bank 0 is "0", and the row address of the updated VAR "0" of the bank 0 is "0", that is, the row addresses are the same, and thus the active flag AFR of the bank 0 is set to "1". Note that the read-target virtual address is stored in the working queue start address TMPS. The VARs of the bank 1 and the bank 2 are not updated, and thus, the AFRs are not updated.

In addition, the access history registers AAR_2 to AAR_5 are updated with values of AAR_1 to AAR_4, respectively, and the virtual storage address "0 of bank 0", for which a reading instruction is made at the last, is recorded in AAR_1.

Operational Examples: Immediately before Data P1-5 is Read

Figure 19:
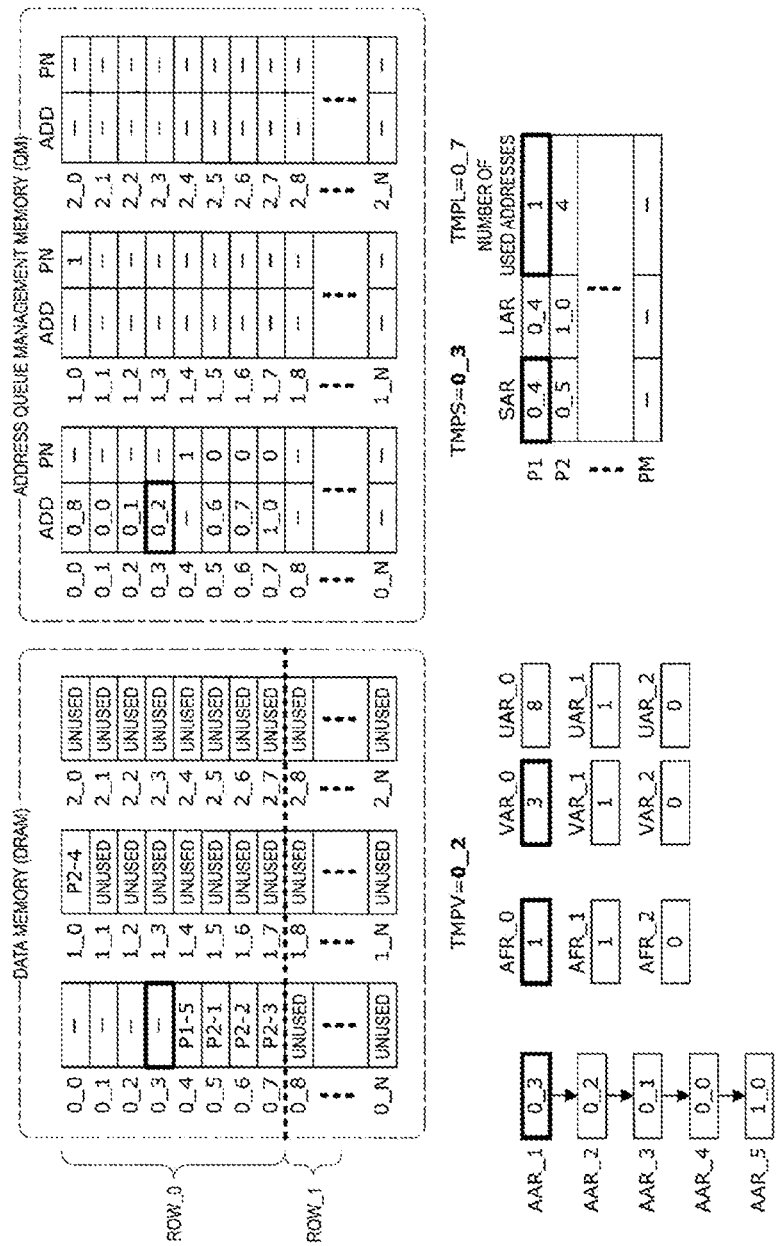
FIG. 19 is an explanatory diagram illustrating the queue control information immediately before data P1-5 is read (immediately after data P1-4 is read).

FIG. 19 is an explanatory diagram illustrating the queue control information immediately before the data P1-5 is read (immediately after the data P1-4 is read). The pointers PNs of the read-target virtual addresses of data P1-1 to data P1-3 were "0 (not the frame end)", and thus, a state is illustrated in which the data items P1-2, P1-3, and P1-4 were sequentially read after the state in FIG. 18. The change in the queue control information when the data items P1-2, P1-3, and P1-4 are read is similar to that of FIG. 18. Here, the queue control information immediately before the data P1-5 is read, i.e., immediately after the data P1-4 is read is illustrated.

In this state, in the virtual data memory, the virtual storage addresses "0 to 3" of the bank 0 are in an empty state, the data P1-5 of the queue P1 is written to the virtual storage address "4" of the bank 0, the data items P2-1 to P2-3 of the queue P2 are written to the virtual storage addresses "5 to 7" of the bank 0, and the data P2-4 of the queue P2 is written to the virtual storage address "0" of the bank 1. Furthermore, the virtual storage addresses "8 to N" of the bank 0, the virtual storage addresses "1 to N" of the bank 1, and the bank 2 are unused.

In addition, the data D of the read-target virtual address "3 of bank 0" is not present due to the previous data P1-4 being read, and thus, this virtual storage address "3 of bank 0" is a position where next data for the bank 0 is written. In a case where the data is read, the unused address UAR of the bank 0 is not updated. Furthermore, in accordance with an order of the virtual addresses that are in an empty state due to the data items P1-1 to P1-4 being read, the subsequent virtual addresses ADDs for the virtual storage addresses "1, 2, and 3" of the bank 0 are "0, 1, and 2" of the bank 0. Any value is invalid even if stored in the pointers PNs of the read-target virtual addresses "1 of bank 0", "2 of bank 0", and "3 of bank 0" which are in an empty state.

Regarding the queue P1, the queue start address SAR indicates the virtual storage address of the data P1-5 "4 of bank 0", and the queue last address LAR indicates the virtual storage address of the data P1-5 "4 of bank 0". Regarding the queue P2, the queue start address SAR indicates the virtual storage address of the data P2-1 "5 of bank 0", and the queue last address LAR indicates the virtual storage address of the data P2-2 "0 of bank 1". Note that "2 of bank 0" and "3 of bank 0" are stored in the working next writing address TMPV and the working queue start address TMPS, respectively.

Furthermore, the row address of the read-target virtual address "3" of the bank 0 is "0", and the row address of the updated VAR "3" of the bank 0 is "0", that is, the row addresses are the same, and thus the active flag AFR of the bank 0 is "1". Note that the read-target virtual address is stored in the working queue start address TMPS. The VARs of the bank 1 and the bank 2 are not updated from the state in FIG. 18, and thus, the AFRs are not updated.

In addition, the virtual storage addresses "3 of bank 0" to "0 of bank 0" and "0 of bank 1", for which a reading instruction and a writing instruction are made, are recorded in order from the newest in the access history registers AAR_1 to AAR_5.

Operational Examples: Reading of Data P1-5

Figure 20:
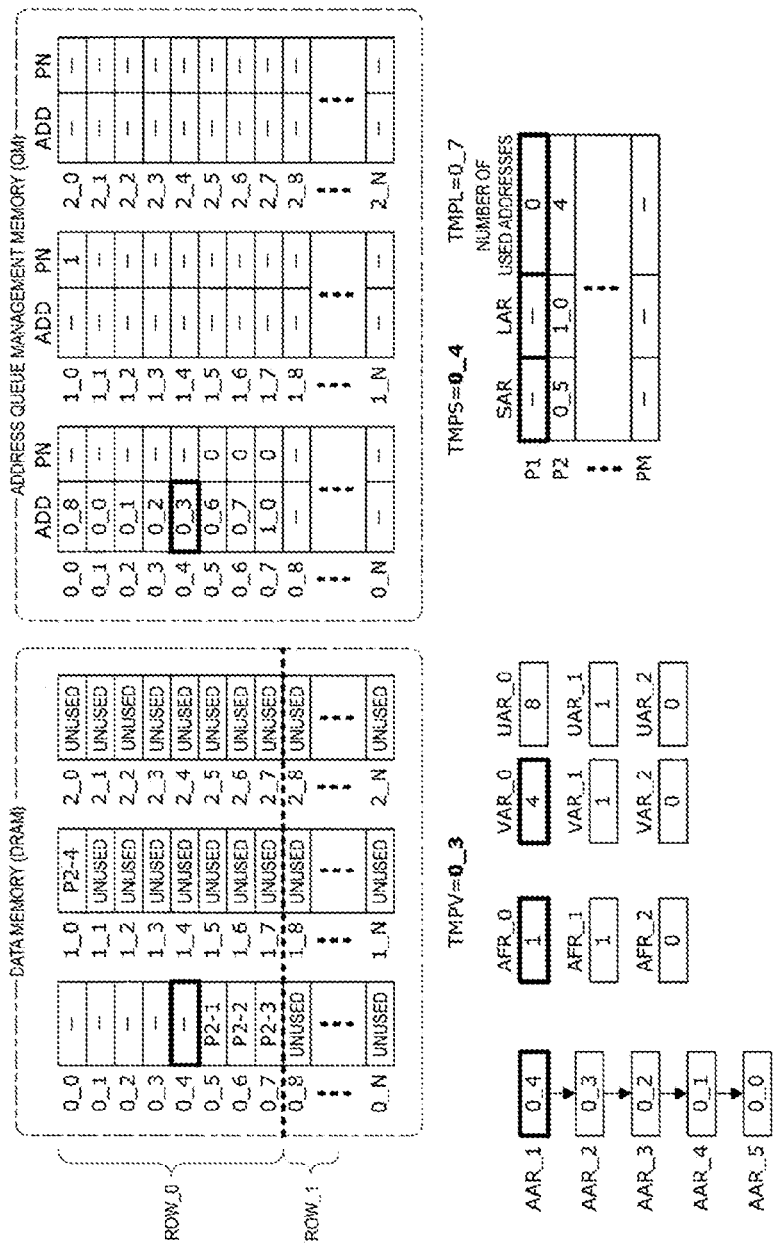
FIG. 20 is an explanatory diagram illustrating a change in the queue control information when the data P1-5 is read.

The pointer PN of the read-target virtual address of the data P1-4 is "0 (not the frame end)", and thus, if the data P1-5 of the queue P1 is read in the state illustrated in FIG. 19, the queue control information changes as illustrated in FIG. 20. FIG. 20 is an explanatory diagram illustrating a change in the queue control information when the data P1-5 is read.

First, a read-target bank is searched. In the state of FIG. 19, the read-target virtual address indicated by the queue start address SAR for the queue P1 is "4 of bank 0". Thus, the data P1-5 is read from "4 of bank 0". Note that the pointer PN of the read-target virtual address "4 of bank 0" indicates "1", which shows that P1-5 is the frame end.

Prior to updating the management memory, a value of the VAR of the read source bank 0 "3 of bank 0" is stored in the working next writing address TMPV, and a value of the SAR of the queue P1 "4 of bank 0" is stored in the working queue start address TMPS.

Next, the management memory is updated.

The data D of the read-target virtual address "4 of bank 0" is not present, and there is no data for the queue P1. Thus, the number of used addresses of the queue P1 is "0", and any value is invalid even if stored in the queue start address SAR for the queue P1 and the queue last address LAR for the queue P1.

In addition, the data D of the read-target virtual address "4 of bank 0" is not present, and thus, this virtual storage address "4 of bank 0" is a position where next data for the bank 0 is written. Thus, the next writing address VAR for the bank 0 is updated from "3" to "4". In accordance with this, the virtual address "3", which is used to be the next writing address VAR of the bank 0 before the data is read, is to be subsequent to the new next writing address VAR "4", and thus, "3 of bank 0" is set as the virtual address ADD subsequent to the virtual storage address "4 of bank 0". Any value is invalid even if stored in the pointer PN of the read-target virtual address "4 of bank 0" which is in an empty state. Note that the virtual address which was the next writing address VAR before the data is read is stored in the working next writing address TMPV. In a case where the data is read, the UAR of the bank 0 is not updated. The VARs and the UARs of the bank 1 and the bank 2 are also not updated.

Furthermore, the row address of the read-target virtual address "4" of the bank 0 is "0", and the row address of the updated VAR "4" of the bank 0 is "0", that is, the row addresses are the same, and thus the active flag AFR of the bank 0 is set to "1". Note that the read-target virtual address is stored in the working queue start address TMPS. The VARs of the bank 1 and the bank 2 are not updated, and thus, the AFRs are not updated.

In addition, the access history registers AAR_2 to AAR_5 are updated with values of AAR_1 to AAR_4, respectively, and the virtual storage address "4 of bank 0", for which a reading instruction is made at the last, is recorded in AAR_1.

Operational Examples: Writing of Data P1-6

Figure 21:
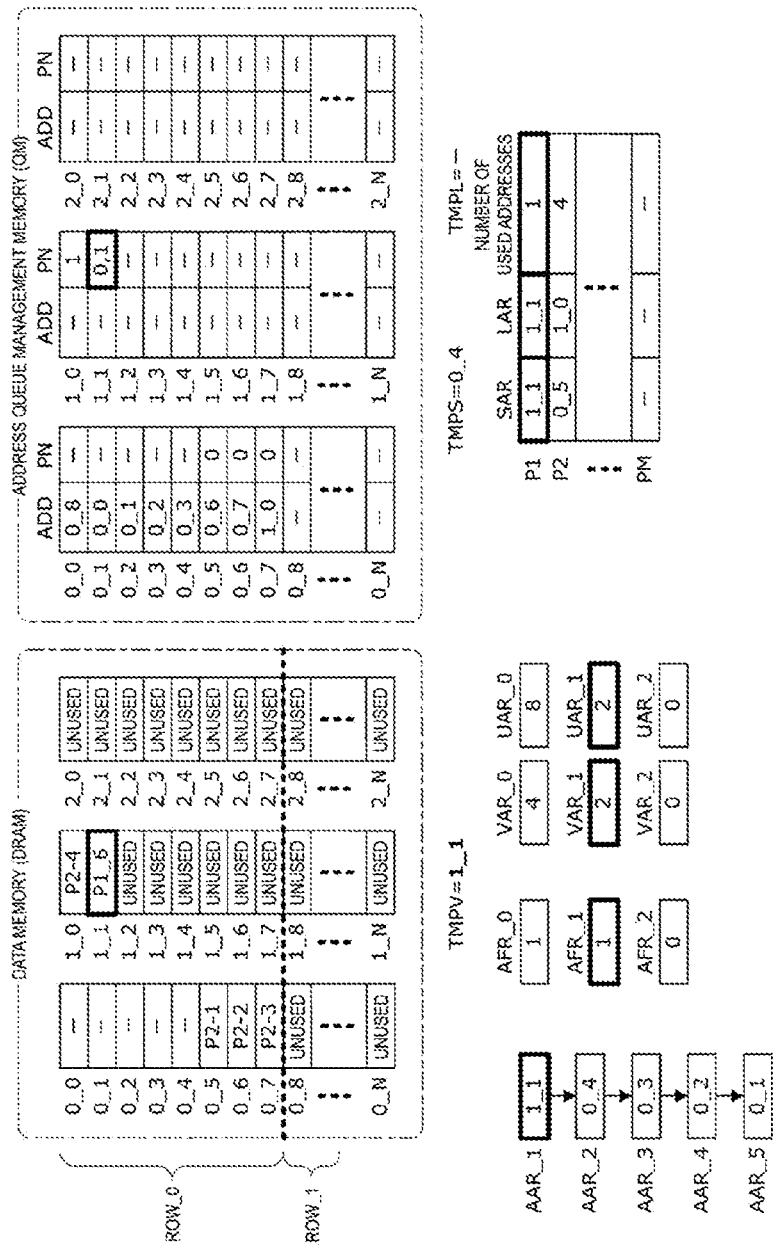
FIG. 21 is an explanatory diagram illustrating a change in the queue control information when data P1-6 is written.

In the state illustrated in FIG. 20, if the data P1-6 of the queue P1 is written, the queue control information changes as in FIG. 21. FIG. 21 is an explanatory diagram illustrating a change in the queue control information when the data P1-6 is written.

First, a write-target bank is selected.

Initially, the AAR and the VAR are compared to search a bank in which the row address of the VAR is activated (identical row address VAR search processing). In the state of FIG. 20, the virtual address recorded in the AAR is only "0 to 4" of the bank 0, and in this case, only the row address "0" of the bank 0 is activated. The VAR of the bank 0 is "4", and in this case, the row address is "0", and thus, is in an activated state.

Thus, the bank 0 may be selected to write the data, but, here, another bank is selected in consideration of the immediately preceding access being for reading data.

Note that a reason why the bank 0 is not selected in this case is that according to the specification of the DRAM, if data is written into the identical bank from which data is read, latency occurs, and thus, effective throughput is deteriorated.

Next, the AFR is referred to search a bank (other than the bank 0) in which the row address of the VAR is activated (active VAR search processing). In this case, the AFR of the bank 1 indicates "1 (activated)", and thus, the bank 1 is selected. As a result, the data is written without the activation processing, which not only can suppress deterioration in effective throughput but also can reduce power consumption due to the activation processing.

In this case, in the configuration without AFR known in the art, it is overlooked that the row address of the VAR of the bank 1 is in an activated state. As a result, a bank on which the activation processing can be immediately started needs to be searched. In this case, the virtual address is not recorded in the AARs of the bank 1 and the bank 2, and thus, either one of the bank 1 or the bank 2 is to be selected. Here, if the bank 2 is selected, the data is written immediately after the activation processing is performed, and thus, it is possible to suppress deterioration in effective throughput, but power is consumed for the activation processing.

Prior to updating the management memory, a value of the VAR of the selected bank 1 "1 of bank 1" is stored in the working next writing address TMPV, and a value of the LAR of the queue P1 is stored in the working queue last address TMPL. However, the number of used addresses of the queue P1 before the data is written is "0", and thus, a value indicated by the LAR is an invalid value.

Next, the management memory is updated.

The data P1-6 is written to the write-target virtual address "1" indicated by the next writing address VAR of the bank 1, and thus, P1-6 is final data of the queue P1. Then, the queue final position is the virtual storage address "1 of bank 1", and thus, the queue last address LAR of the queue P1 is updated to "1 of bank 1".

Note that the number of used addresses of the queue P1 before the data is written is "0", and thus, the data P1-6 also serves as a start position of the queue P1, and the queue start address SAR of the queue P1 is also updated to "1 of bank 1".

There is no data preceding the data P1-6 in the queue P1, and thus, the virtual storage address of P1-6 is not yet set as the subsequent virtual address ADD. IF P1-6 is the frame end, "1" is set to the pointer PN of the virtual storage address of P1-6 "1 of bank 1", and if P1-6 is not the frame end, "0" is set to the pointer PN.

In addition, P1-6 is written to the write-target virtual address "1" indicated by the next writing address VAR (for the bank 1) before the data is written, and thus, the next writing address VAR of the bank 1 is updated from "1" to "2". Note that the UAR of the bank 1 is also updated from "1" to "2", but the VARs and the UARs of the bank 0 and the bank 2 are not updated.

Furthermore, the row address of the write-target virtual address "1" of the bank 1 is "0", and the row address of the updated VAR "2" of the bank 1 is "0", that is, the row addresses are the same, and thus the active flag AFR of the bank 1 is set to "1". Note that the write-target virtual address is stored in the working next writing address TMPV. The VARs of the bank 0 and the bank 2 are not updated, and thus, the AFRs are not updated.

In addition, the access history registers AAR_2 to AAR_5 are updated with values of AAR_1 to AAR_4, respectively, and the virtual storage address "1 of bank 1", for which a writing instruction is made at the last, is recorded in AAR_1.

Note that in order to avoid writing the data to the identical bank immediately after data is read, the active flag AFR may be utilized as means to indicate that the data is just read from the bank. For example, if the row address of the read-target virtual address and the row address of the updated VAR are the same when the data is read, the AFR may not be immediately set to "1", but may be set to "0" once and then set to "1" at a timing when a predetermined amount of time has elapsed.

However, if a next writing or reading is performed before the predetermined amount of time has elapsed, the update of the AFR by the write or read processing is prioritized.

Even though a bank in which the row address of the VAR is activated is found as a result of comparing the AAR and the VAR, it can be seen that data is just read from the bank if the AFR of the bank is "0", and thus, the occurrence of latency can be avoided by selecting another bank.

DRAM Writing Operation

Figure 22:
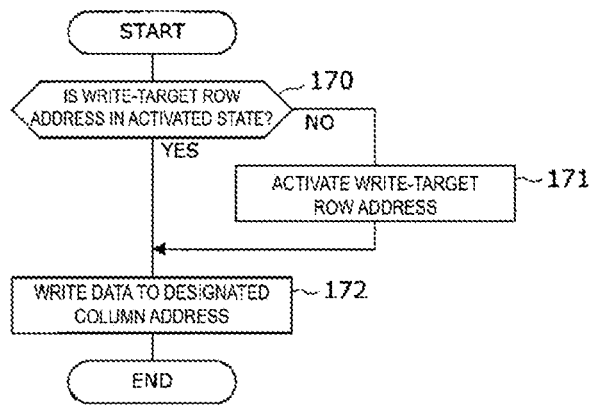
FIG. 22 is a flowchart illustrating DRAM write processing.

Next, a DRAM writing operation in the DRAM access unit 32 according to the present embodiment will be described with reference to FIG. 22. FIG. 22 is a flowchart illustrating DRAM write processing.

The DRAM access unit 32 performs the DRAM write processing of FIG. 22 in response to a DRAM writing instruction from the writing control unit 34.

First, the activation processing unit 32B determines whether the write-target row address designated in a DRAM writing instruction accumulated in the FIFO memory 32A is in an activated state (step 170). If the write-target row address is not in an activated state (step 170: NO), the activation processing unit 32B activates the write-target address (step 171), and the activation process is ended. Note that if the write-target row address is in an activated state (step 170: YES), the activation processing is ended without performing anything.

After the activation processing in the activation processing unit 32B is completed, the DRAM writing instruction is output from the FIFO memory 32A, and is input to the DRAM writing unit 32D via the access type determining unit 32C.

In response to this, the DRAM writing unit 32D writes the frame data (data D) designated in the DRAM writing instruction to a column address corresponding to the input DRAM writing instruction (step 172), and a series of DRAM write processing is ended.

In the present embodiment, when the frame data is written into the DRAM constituting the data memory 31, the writing control unit 34 preferentially selects, as a write-target bank, from among banks included in the DRAM, a bank in which a write-target row address is in an activated state. This reduces the probability of occurrence of writing data to a different row address in the identical bank. As a result, the number of times for waiting the activation of the row address and the completion of access to a different row address at the time of writing frame data is reduced, and thus, deterioration in effective throughput of DRAM access is suppressed.

DRAM Reading Operation

Figure 23:
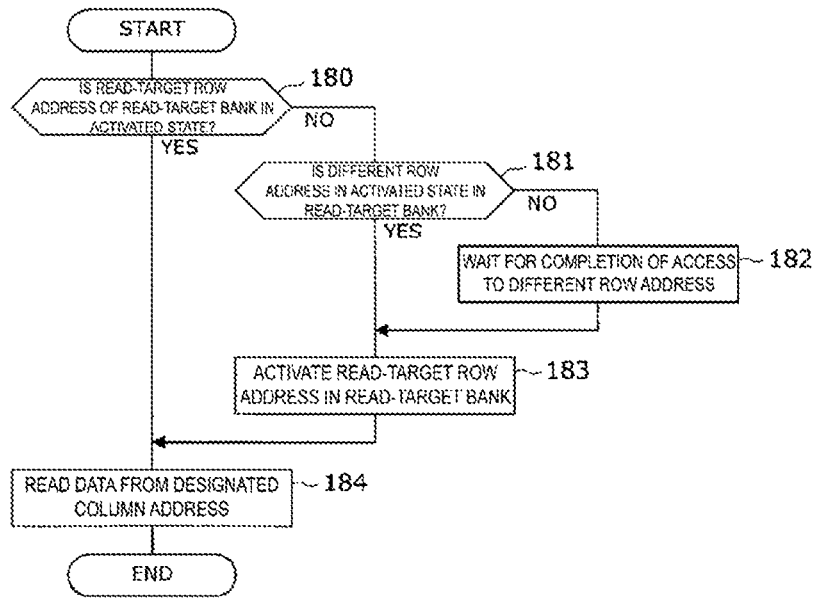
FIG. 23 is a flowchart illustrating DRAM read processing.

Next, a DRAM reading operation in the DRAM access unit 32 according to the present embodiment will be described with reference to FIG. 23. FIG. 23 is a flowchart illustrating DRAM read processing.

The DRAM access unit 32 performs the DRAM read processing of FIG. 23 in response to a DRAM reading instruction from the reading control unit 35.

First, the activation processing unit 32B determines whether a read-target row address is in an activated state in the read-target bank designated in a DRAM reading instruction accumulated in the FIFO memory 32A (step 180, and if the read-target row address is in an activated state (step 180: YES), the activation processing is ended without performing anything.

After the activation processing in the activation processing unit 32B is completed, the DRAM reading instruction is output from the FIFO memory 32A, and is input to the DRAM reading unit 32E via the access type determining unit 32C.

In response to this, the DRAM reading unit 32E reads the frame data (data D) from the indicated column address from among read-target row addresses of the read-target bank corresponding to the input DRAM reading instruction (step 184), and the DRAM read processing is ended.

If the read-target row address of the read-target bank is not in an activated state (step 180: NO), the activation processing unit 32B determines whether a different row address is in an activated state in the read-target bank (step 181).

Here, if a different row address is not in an activated state (step 181: NO), the activation processing unit 32B activates the read-target row address in the read-target bank (step 183), and the activation processing is ended. As a result, data is read from the activated read-target row address in the DRAM reading unit 32E.

If a different row address is in an activated state (step 181: YES), the activation processing unit 32B waits for the completion of access to the different row address (step 182), then proceeds to step 183 to activate the read-target row address in a similar manner to that mentioned before.

As described above, when the frame data is read from the DRAM constituting the data memory 31, the frame data to be read is written into a specific bank, and thus, a bank in which the row address is in an activated state cannot be selected as in a case where data is written as described above. Thus, latency occurs at the time of reading data from a different row address of the identical bank or reading data from the identical bank after writing data. Note that if data is read from a different row address of the identical bank, for example, a processing interval may be provided so that writing is inserted between readings to prevent a case where data is continuously read from a different row address.

Effect of First Embodiment

As described above, according to the present embodiment, in the recording device 30, the data memory 31 is composed of a DRAM having a write pointer for each bank, and a queue control memory 33 is provided that stores an active flag indicating whether or not a row address of the write pointer is in an activated state for each bank. According to the present embodiment, when frame data is written into a write-target queue, a bank for which an active flag indicates an activated state is selected from among banks as a write-target bank, and the frame data is written into the selected bank. Furthermore, according to the present embodiment, if there is no bank for which the active flag indicates an activated state, a bank for which the active flag indicates a deactivated state is selected as the write-target bank, and the frame data is written into the bank after a row address of the write pointer of the bank is activated.

In general, in the DRAM, if data is written to any row address of any bank, the row address needs to be activated in the bank, and in a case of accessing a different row address of an identical bank, it is necessary to wait for access with the row address to be completed and then activate a new row address, and thus, relatively long latency occurs due to the activation of the row address in accessing the identical bank. Specifically, the latency occurs when a different row address of the identical bank is continuously accessed. Other conditions for occurrence of latency include a case of writing data into the identical bank after data is read, and a case of reading data from the identical bank after data is written.

According to the present embodiment, when frame data is written into a DRAM constituting the data memory 31, a bank for which the active flag indicates an activated state is preferentially selected as a write-target bank from among banks included in the DRAM.

This can reduce the probability of occurrence of writing data into a different row address of the identical bank. As a result, the number of times for waiting the activation of the row address and the completion of access to a different row address at the time of writing frame data can be reduced, deterioration in effective throughput for DRAM access can be suppressed, and power consumption due to the activation processing can be reduced.

Furthermore, according to the present embodiment, in the recording device 30, a subsequent address indicating a virtual storage address of communication data subsequent to communication data written to the virtual storage address may be stored for each virtual storage address, a queue start address and a queue last address indicating a start and a last of the virtual storage address to which the communication data of the queue is written may be stored for each queue, and a next writing address indicating a virtual storage address to which communication data is written next may be stored for each bank, in common to queues.

In addition, the writing control unit 34 may write, when the communication data is written into the write-target queue (a writing instruction is made), the communication data to a write-target virtual address including a next writing address of a selected bank, and update a queue last address of the write-target queue, a subsequent virtual address for the queue last address before the data is written, and a next writing address of the selected bank, respectively. The reading control unit 35 may read, when the communication data is read from a read-target queue (a reading instruction is made), the communication data from a read-target virtual address (including bank information) including a queue start address of the read-target queue, and update the queue start address of the read-target queue, a next writing address of a read-target bank, and a subsequent virtual address for a new next writing address (for the read-target bank).

As a result, frame data of each queue is sequentially written to a virtual storage address that is in an empty state, and a virtual storage address from which frame data is read is managed as an address that is in an empty state again. The virtual storage address of the frame data is also managed in a writing order for each queue. The virtual storage address in an empty state can be shared by a plurality of queues, and thus, it is possible to improve use efficiency of the memory as compared to a well-known case where an address range is fixedly secured in advance for each queue. Thus, there is no need to increase the memory capacity, as a result of which increase in circuit size or cost can be suppressed.

Furthermore, according to the present embodiment, when the next writing address of the bank selected as the write-target bank is updated, the writing control unit 34 may set an active flag of the write-target bank to a value indicating an activated state if a row address of a current write pointer corresponding to the write-target virtual address of the write-target bank and a row address of an updated write pointer corresponding to an updated next writing address are the same, and set the flag to a deactivated state if the row addresses are different from each other.

Furthermore, when the next writing address of the read-target bank is updated, the reading control unit 35 may set an active flag of the read-target bank to a value indicating an activated state if a row address of a read pointer corresponding to the read-target virtual address of the read-target bank and a row address of an updated write pointer corresponding to an updated next writing address are the same, and set the flag to a deactivated state if the row addresses are different from each other.

In addition, an access history for the latest n times including addresses from which data is written or read may be stored, and when the writing control unit 34 issues instruction for writing data to a write-target queue, and when the reading control unit 35 issues instruction for reading data from a read-target queue, a write-target or read-target virtual address may be added to the access history.

Thus, even if there is no bank for which the active flag indicates an activated state, a bank for which a preceding writing or reading has already completed, or a bank for which a preceding writing or reading is completed earliest can be found. As a result, a writing instruction is made by selecting a bank on which the activation processing can be immediately started or a bank on which the activation processing can be started earliest, and thus, it is possible to suppress deterioration in effective throughput for DRAM access.

In addition, only within a range remaining in the access history, if there are a plurality of banks for which the active flag indicates an activated state, a bank for which a writing instruction or a reading instruction is made at the last can be found. As a result, a plurality of items of data D divided, from one frame data, in accordance with a data size for one virtual address, can be written to the identical row address of the identical bank.

In addition, in the present embodiment, there is no need to set an initial value such as an ADD value in the QM. In the present embodiment, information of which initial value should be set at the time of activation of the communication input/output apparatus 1 is only the VAR, the UAR, the AAR, and the AFR (see "Initialization" in FIG. 13). This provides an effect that a size of a circuit for performing an initial setting or a size of a software for performing an initial setting is extremely small, and a time required for the initial setting is extremely short.

Note that in FIG. 13 and the like, a case is illustrated where the PN for storing the EoF value is mounted in the QM, but the PN may be mounted in the DRAM.

Second Embodiment

Next, the communication input/output apparatus 1 according to a second embodiment of the present invention will be described with reference to FIG. 24. FIG. 24 is a block diagram illustrating a configuration of an access arbitration unit according to the second embodiment.

In the communication input/output apparatus 1 according to the first embodiment, when a virtual storage address of a virtual data memory is shared by a plurality of queues, if, for example, a large amount of frame data for a certain output system is input, the virtual storage address of the virtual data memory may be occupied by a queue for the output system. Such occupancy of a storage address is not limited to the first embodiment, and may occur in any configuration in which a storage address is shared by a plurality of queues. Thus, if such occupancy of a storage address occurs, a queue for another output system cannot use a sufficient number of storage addresses, and discarding of frame data is more likely to occur, resulting in deterioration in communication quality.

The present embodiment is directed to avoiding occupancy of a storage address by a particular queue in a case where a storage address is shared by a plurality of queues as described above. In the recording device 30, the access arbitration unit 37 is configured to, when frame data is written into a write-target queue (a writing instruction is made), calculate, based on a data length of the frame data, the required number of addresses indicating the number of virtual storage addresses required for writing the frame data, calculate, based on the number of used addresses of the write-target queue or queues that is acquired from the queue-using address number memory 36, the number of remaining virtual addresses indicating the number of virtual storage addresses available for the writing, determine whether writing the frame data is available by comparing the required number of addresses and the number of remaining virtual addresses, and instruct the writing control unit 34 to write the frame data in response to a determination that the writing is available.

Figure 24:
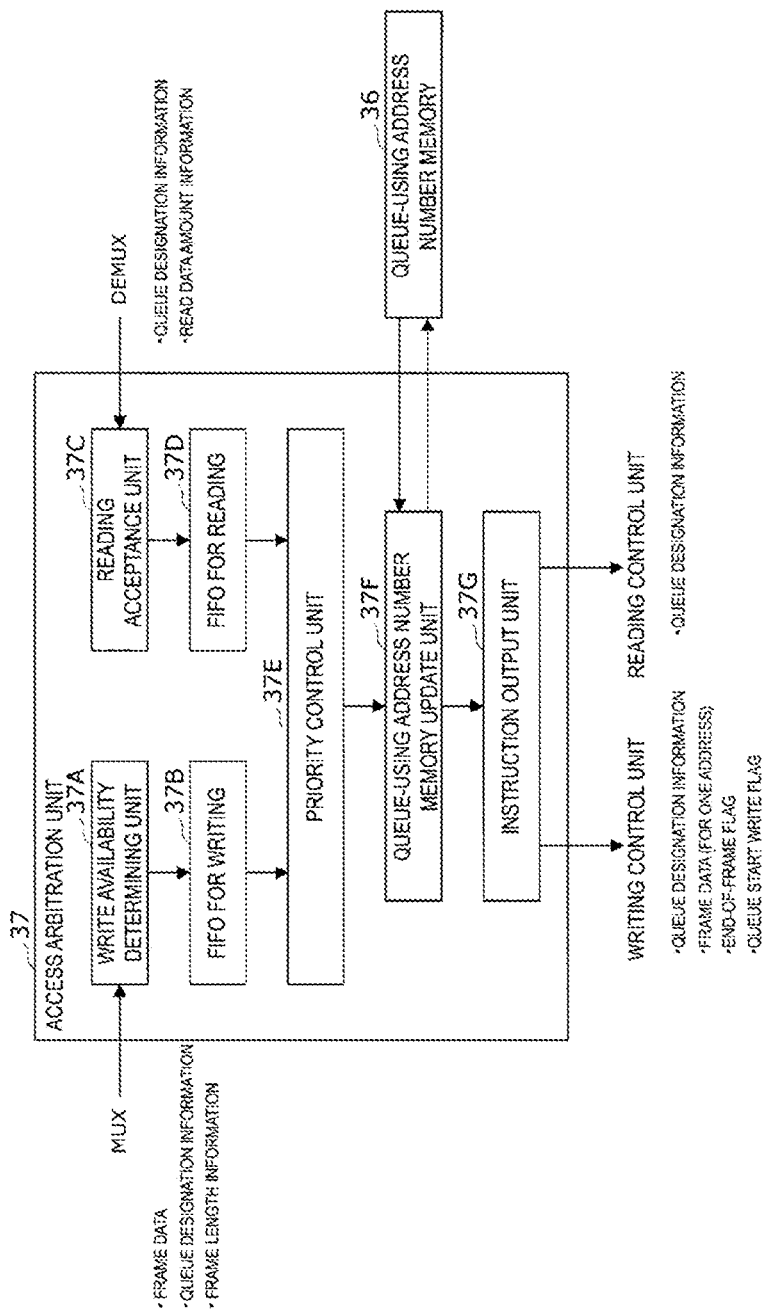
FIG. 24 is a block diagram illustrating a configuration of an access arbitration unit according to a second embodiment.

As illustrated in FIG. 24, in the present embodiment, the access arbitration unit 37 includes, as main circuit units, a writing availability determination unit 37A, a FIFO for writing 37B, a reading acceptance unit 37C, a FIFO for read 37D, a priority control unit 37E, a queue-using address number update unit 37F, and an instruction output unit 37G.

The writing availability determination unit 37A has a function of determining whether or not writing is available based on queue designation information and frame length information added to frame data transferred from the multiplexer 10, determination address number information preset for each queue, and the number of used virtual addresses in each queue, and a function of dividing, in response to a determination result that the writing is available, the frame data into a data size for one virtual address in a storage area provided in the data memory 31, and writing, into the FIFO for writing 37B, a writing instruction in which the queue designation information is added to the acquired data.

The determination address number information includes the maximum number of virtual addresses NKmax that can be used in the write-target queue designated in the queue designation information, and the minimum guaranteed number of virtual addresses NKmin that is guaranteed for use to the write-target queue.

Figures 25, 26:
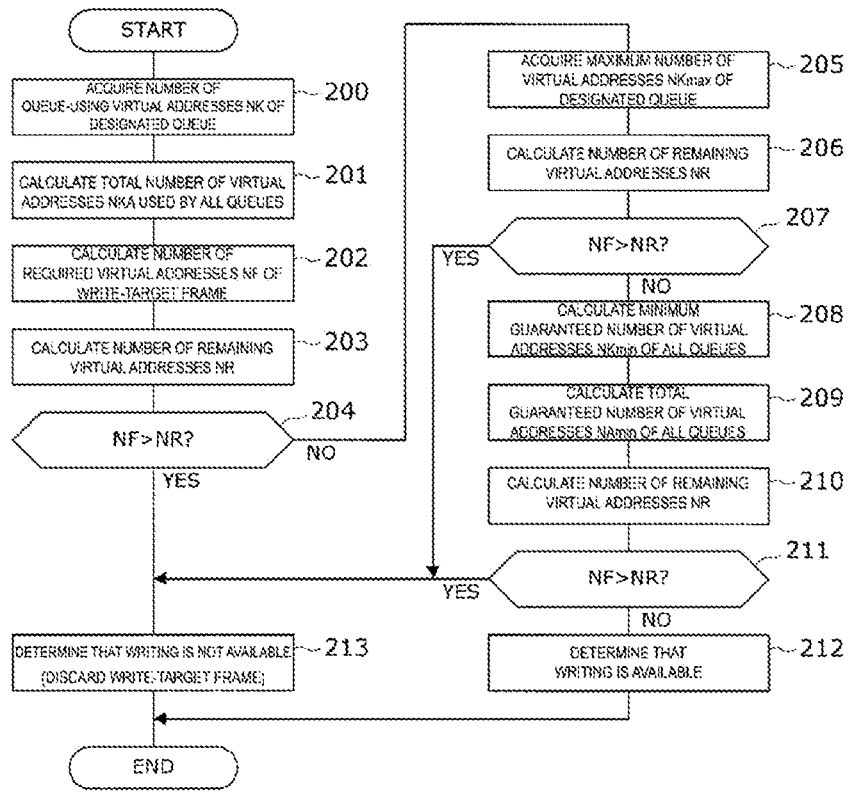
FIG. 25 illustrates an example of a configuration of determination address number information.
FIG. 26 is a flowchart illustrating writing availability determination processing according to the second embodiment.
Figures 27, 28:
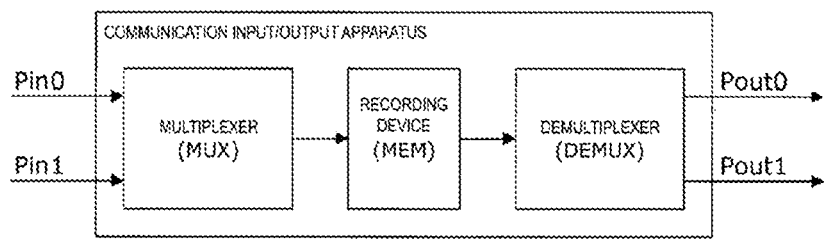
FIG. 27 is a block diagram illustrating a configuration of a communication input/output apparatus (built-in memory) known in the art.
FIG. 28 is an explanatory table showing correspondence between a queue and an output port.

FIG. 25 illustrates an example of a configuration of the determination address number information. Here, the maximum number of virtual addresses NKmax and the minimum guaranteed number of virtual addresses NKmin are set for each queue ID for identifying a queue. These items of determination address number information are stored in an internal memory (not illustrated) of the queue-using address number update unit 37F or the access arbitration unit 37, for example.

The reading acceptance unit 37C has a function of calculating, based on read data amount information of a reading request output from the demultiplexer 20, the number of times of reading from the data memory 31, and writing, into the FIFO for reading 37D, as a reading instruction, queue designation information of the reading request for the number of times of reading. In this calculation, a value obtained by dividing a data amount indicated by the read data amount information by a data size per virtual address of the data memory 31 is defined as the number of times of reading. If there is a remainder, 1 may be added to the number of times of reading.

The priority control unit 37E has a function of reading, from the FIFO for writing 37B or the FIFO for reading 37D, a writing instruction or a reading instruction to output the instruction to the queue-using address number update unit 37F, and a function of preferentially reading a writing instruction from the FIFO for writing 37B if a writing instruction and a reading instruction are present in both of the FIFO for writing 37B and the FIFO for reading 37D.

The queue-using address number update unit 37F has a function of adding, if a writing instruction is input from the priority control unit 37E, 1 to the number of used virtual addresses of a write-target queue corresponding to the queue designation information in the writing instruction, of the queue-using address number memory 36, to output the writing instruction to the instruction output unit 37G, and a function of subtracting, if a reading instruction is input from the priority control unit 37E, 1 from the number of used virtual addresses of a read-target queue corresponding to the queue designation information in the reading instruction, in the queue-using address number memory 36, to output the reading instruction to the instruction output unit 37G.

The instruction output unit 37G has a function of outputting, if a writing instruction is input from the queue-using address number update unit 37F, the writing instruction to the writing control unit 34, and a function of outputting, if a reading instruction is input, the reading instruction to the reading control unit 35.

Operations in Second Embodiment

Next, with reference to FIG. 26, a writing determination operation at the time of writing frame data will be described as an operation of the access arbitration unit 37 according to the present embodiment. FIG. 26 is a flowchart illustrating writing availability determination processing according to the second embodiment.

The access arbitration unit 37 of the recording device 30 determines writing availability for each frame data transferred from the multiplexer 10, based on the writing availability determination processing in FIG. 26.

First, the access arbitration unit 37 acquires the number of used virtual addresses NK for all queues from the queue-using address number memory 36 (step 200), calculates the total number of virtual addresses NKA used by all the queues (step 201), and calculates the required number of virtual addresses NF required for writing target frame data to be written (step 202).

Then, the access arbitration unit 37 subtracts NKA from the total number of virtual storage addresses NA in the virtual data memory to calculate the number of remaining virtual addresses NR indicating the number of virtual storage addresses that can be used to write the target frame data (step 203), and compares NF and NR (step 204).

Here, if NF>NR (step 204: YES), the access arbitration unit 37 determines that writing is not available and discards the target frame data (step 213), and the writing determination processing for the target frame data is ended.

On the other hand, if NF≤NR (step 204: NO), the access arbitration unit 37 acquires the maximum number of virtual addresses NKmax of the designated write-target queue from the queue-using address number memory 36 or the like (step 205), subtracts NK from NKmax to calculate the number of remaining virtual addresses NR (step 206), and compares NF and NR (step 207).

Here, if NF>NR (step 207: YES), the access arbitration unit 37 determines that writing is not available and discards the target frame data (step 213), and the writing determination processing for the target frame data is ended.

On the other hand, if NF NR (step 207: NO), the access arbitration unit 37 acquires the minimum guaranteed number of virtual addresses NKmin for all queues from the queue-using address number memory 36 (step 208), and calculates the total guaranteed number of virtual addresses NAmin that is to be guaranteed at minimum for all the queues as a whole (step 209). At this time, if the number of queue-using virtual addresses NK of any queue is equal to or greater than the minimum guaranteed number of virtual addresses, the number of queue-using virtual addresses NK is added as the guaranteed number of virtual addresses of the queue, and if the number of queue-using virtual addresses NK is less than the minimum guaranteed number of virtual addresses, the minimum guaranteed number of virtual addresses NKmin is added as the guaranteed number of virtual addresses of the queue.

Then, the access arbitration unit 37 subtracts the NAmin from the NA to calculate the number of remaining virtual addresses NR (step 210), and compares NF and NR (step 211).

Here, if NF>NR (step 211: YES), the access arbitration unit 37 determines that writing is not available and discards the target frame data (step 213), and the writing determination processing for the target frame data is ended.

On the other hand, if NF≤NR (step 211: NO), the access arbitration unit 37 determines that writing is available for the target frame data (step 212), and the writing determination processing for the target frame data is ended.

Then, in response to the determination that the writing is available, the access arbitration unit 37 divides the target frame data into a data size for one virtual address, and writes, into the FIFO for writing 37B, a writing instruction in which the queue designation information is added to the resultant data.

Effect of Second Embodiment

As described above, according to the present embodiment, in the recording device 30, the queue-using address number memory 36 stores, for each queue, the number of used addresses indicating the number of virtual storage addresses used by the queue. In addition, according to the present embodiment, in the recording device 30, the access arbitration unit 37 is configured to, when communication data is written into a write-target queue (a writing instruction is made), calculate, based on a data length of the communication data, the required number of addresses indicating the number of virtual storage addresses required for writing the data, calculate, based on the number of used virtual addresses or the like of the write-target queue or each queue that is acquired from the queue-using address number memory 36, the number of remaining virtual addresses indicating the number of virtual storage addresses available for the writing, determine whether writing the communication data is available by comparing the required number of addresses and the number of remaining virtual addresses, and instruct the writing control unit 34 to write the communication data in response to a determination that the writing is available.

Thus, the number of virtual storage addresses used by each queue is limited, and thus, it is possible to suppress occupancy of a virtual storage address by a queue corresponding to any output system. As a result, even if a large amount of frame data for a specific output system is input, a queue for another output system can use a sufficient number of virtual storage addresses. This prevents discarding of frame data and deterioration in communication quality due to the discarding, and thus, there is no need to increase the memory capacity as a countermeasure against the above problems, as a result of which increase in circuit size or cost can be suppressed.

Note that NKA and NAmin may be simultaneously calculated (added, subtracted, or the like) in the present embodiment when the queue-using address number memory 36 is updated.

In the present embodiment, in a case where the access arbitration unit 37 having the configuration of FIG. 24 is employed, if writing instruction data is present in the FIFO for writing 37B, there is a possibility to mistakenly determine that writing is available. To prevent erroneous determinations, a value obtained by adding the number of virtual addresses (the number of writing instructions) in the FIFO for writing 37B to the information of the queue-using address number memory 36 may be used as the number of used virtual addresses of each queue, or a value obtained by subtracting the number of virtual addresses (the number of writing instructions) in the FIFO for writing 37B may be used as NA or NKmax.

Expansion of Embodiment

The present invention has been described above with reference to the embodiments, but the present invention is not limited to the above-described embodiments. Various changes understood by a person skilled in the art within the scope of the present invention can be made to the configurations and details of the present invention. Furthermore, the embodiments can be performed in any combination within a range where no inconsistency occurs.

In each of the above-described embodiments, if a multicast frame is processed by the communication input/output apparatus 1, an output system for multicast may be provided as one of the output systems, means for outputting the multicast frame to a plurality of the speed converting units 23 may be provided in the distribution unit 22 in the demultiplexer 20, and some of queues logically formed in the data memory 31 of the recording device 30 may be allocated as queues corresponding to the output system for multicast.

As a result, the multicast frame input from the outside to the multiplexer 10 is temporarily stored in the queue corresponding to the output system for multicast in the data memory 31, and the multicast frame is read from the queue by the demultiplexer 20 to be output from a plurality of output ports.

REFERENCE SIGNS LIST

1 . . . Communication input and output apparatus
10 . . . Multiplexer
11 . . . Queue designation information adding unit
12 . . . Multiplexing unit
20 . . . Demultiplexer
21 . . . Read unit
22 . . . Distribution unit
23, 24 . . . Speed converting unit
30 . . . Recording apparatus
31 . . . Data memory
32 . . . DRAM access unit
32A . . . FIFO memory
32B . . . Activation processing unit
32C . . . Access type determining unit
32D . . . DRAM writing unit
32E . . . DRAM reading unit
33 . . . Queue control memory
34 . . . Write control unit 35 . . . Read control unit
36 . . . Queue-using address number memory
37 . . . Access arbitration unit
37A . . . Write availability determining unit
37B . . . FIFO for write
37C . . . Read accepting unit
37D . . . FIFO for read
37E . . . Priority control unit
37F . . . Queue-using address number update unit
37G . . . Instruction output unit

The invention claimed is:

1. A communication input/output apparatus, comprising:
a multiplexer configured to multiplex successively input communication data, by adding queue designation information indicating a queue corresponding to an output system through which the communication data is to be output;
a recording device configured to temporarily accumulate the communication data transferred from the multiplexer in a write-target queue designated by the queue designation information from among a plurality of queues logically in a data memory; and
a demultiplexer configured to read the communication data from a read-target queue, from among the plurality of queues, corresponding to an output system selected based on a priority control logic, and convert the communication data so that the communication data has a communication speed of an output port corresponding to the output system to output the communication data,
wherein the recording device includes:
the data memory that comprises a DRAM including a plurality of banks and having a write pointer for each bank, the data memory configured to store the communication data in the plurality of queues;
a queue control memory configured to store an active flag, the active flag indicating whether or not a row address of the write pointer is in an activated state for each bank; and
a DRAM access device configured to, when the communication data is written into the write-target queue, select, from among the plurality of banks, a bank for which an active flag indicates an activated state, as a write-target bank to write the communication data, and select, if there is no bank for which an active flag indicates an activated state, a bank for which an active flag indicates a deactivated state, as a write-target bank, activate a row address of a write pointer of the bank, and thereafter write the communication data, wherein the write-target bank is selected based on searching an access history register (AAR), an active flag register (AFR), and a valid address register (VAR), wherein the AAR is configured to manage which row address is activated in each bank in which access history remains, wherein the AFR is configured to manage whether or not a row address of the VAR of each bank is in an activated state, and wherein the VAR is configured to store address information for each bank indicating a virtual storage address to which received data is to be written next.

2. The communication input/output apparatus according to claim 1, wherein the recording device further includes:
a writing control device configured to instruct the DRAM access device to write the communication data transferred from the multiplexer into the write-target queue, based on queue control information of the queue control memory; and
a reading control device configured to instruct the DRAM access device to read communication data from the read-target queue, based on the queue control information of the queue control memory, and transfer the read communication data to the demultiplexer.

3. The communication input/output apparatus according to claim 2, wherein a plurality of virtual storage addresses are configured to be used on a virtual data memory, and the queue control memory is configured:
to store the active flag for each bank;
to store, for each virtual storage address used on the virtual data memory, a subsequent address indicating a virtual storage address of communication data subsequent to communication data written to each virtual storage address;
to store, for each queue, a queue start address and a queue last address indicating a start and a last of the virtual storage address to which the communication data of each queue is written; and
to store, in common to each of the plurality of queues, a next writing address for each bank indicating a virtual storage address to which communication data is to be written next, the next writing address corresponding one-to-one to the write pointer for each bank.

4. The communication input/output apparatus according to claim 3, wherein the writing control device is configured:
to instruct, when the communication data is written into the write-target queue, the DRAM access device to write the communication data to a write-target virtual address including the next writing address of a bank selected as the write-target bank;
to update a queue last address of the write-target queue, a subsequent address for the queue last address before the communication data is written, and a next writing address of the bank selected as the write-target bank;
to set an active flag of the write-target bank to a value indicating an activated state if a row address of a current write pointer corresponding to the write-target virtual address of the write-target bank and a row address of an updated write pointer corresponding to an updated next writing address are the same; and
to set the active flag to a deactivated state if the row addresses are different from each other.

5. The communication input/output apparatus according to claim 4, wherein the reading control device is configured:
to instruct, when the communication data is read from the read-target queue, the DRAM access device to read the communication data from a read-target virtual address including a queue start address of the read-target queue;
to update a queue start address of the read-target queue, a next writing address of a read-target bank, and a subsequent address for a next writing address of a new read-target bank;
to set an active flag of the read-target bank to a value indicating an activated state if a row address of a read pointer corresponding to the read-target virtual address of the read-target bank and the row address of the updated write pointer corresponding to the updated next writing address are the same; and
to set the active flag to a deactivated state if the row addresses are different from each other.

6. The communication input/output apparatus according to claim 1, wherein the recording device further includes a queue-using address number memory configured to store, for each queue, a number of used addresses indicating a number of virtual storage addresses on the data memory used by the plurality of queues.

7. The communication input/output apparatus according to claim 6, wherein the recording device further includes an access arbitrator configured:
to calculate a required number of addresses indicating a number of virtual storage addresses required for writing the communication data, based on a data length of the communication data, when the communication data is written into the write-target queue;
to calculate a number of remaining addresses indicating a number of virtual storage addresses available for the writing, based on a number of used addresses of the write-target queue or the plurality of queues that is acquired from the queue-using address number memory;
to determine whether writing the communication data is available by comparing the required number of addresses and the number of remaining addresses; and
to instruct writing of the communication data in response to a determination that the writing is available.

8. The communication input/output apparatus according to claim 1, wherein the multiplexer comprises:
a queue designation information adder provided for each input port and configured to output frame data input from a corresponding input port after adding the queue designation information; and
a multiplexing device configured to multiplex the frame data output from each queue designation information adder in a time division manner to output the frame data to the recording device.

9. The communication input/output apparatus according to claim 1, wherein the demultiplexer comprises:
a reader;
a distributor; and
a speed converter provided for each output port.

10. The communication input/output apparatus according to claim 1, wherein the DRAM access device comprises:
a FIFO memory;
an activation processing device;
an access type determining device;
a DRAM writing device; and
a DRAM reading device.

11. The communication input/output apparatus according to claim 1, wherein the queue control memory comprises an empty address register, an address queue management memory, a queue start address memory, a queue last address memory, the AAR, a working address register, and the AFR, and wherein the working address register is configured to store, in common to queues, a working next writing address temporary register TMPV, a working queue last address TMPL, and a working queue start address TMPS.

12. The communication input/output apparatus according to claim 1, wherein the AAR is configured to record a virtual storage address that was subjected to a writing instruction or a reading instruction last.

13. A method of operating a communication input/output apparatus, the method comprising:
successively multiplexing, by a multiplexer, input communication data, by adding queue designation information indicating a queue corresponding to an output system through which the communication data is to be output;
temporarily accumulating, by a recording device, the communication data transferred from the multiplexer in a write-target queue designated by the queue designation information from among a plurality of queues logically in a data memory; and
reading the communication data, by a demultiplexer, from a read-target queue, from among the plurality of queues, corresponding to an output system selected based on a priority control logic, and converting, by the demultiplexer, the communication data so that the communication data has a communication speed of an output port corresponding to the output system to output the communication data,
wherein the recording device includes:
the data memory that comprises a DRAM including a plurality of banks and having a write pointer for each bank, the data memory storing the communication data in the plurality of queues;
a queue control memory storing an active flag, the active flag indicating whether or not a row address of the write pointer is in an activated state for each bank; and
a DRAM access device, when the communication data is written into the write-target queue, selecting, from among the plurality of banks, a bank for which an active flag indicates an activated state, as a write-target bank to write the communication data, and selecting, if there is no bank for which an active flag indicates an activated state, a bank for which an active flag indicates a deactivated state, as a write-target bank, activating a row address of a write pointer of the bank, and thereafter writing the communication data, wherein the write-target bank is selected based on searching an access history register (AAR), an active flag register (AFR), and a valid address register (VAR), wherein the AAR manages which row address is activated in each bank in which access history remains, wherein the AFR manages whether or not a row address of the VAR of each bank is in an activated state, and wherein the VAR stores address information for each bank indicating a virtual storage address to which received data is to be written next.

14. The method according to claim 13, further comprising:
instructing, by a writing control device of the recording device, the DRAM access device to write the communication data transferred from the multiplexer into the write-target queue, based on queue control information of the queue control memory; and
instructing, by a reading control device of the recording device, the DRAM access device to read communication data from the read-target queue, based on the queue control information of the queue control memory, and transferring the read communication data to the demultiplexer.

15. The method according to claim 14, further comprising:
using a plurality of virtual storage addresses on a virtual data memory;
storing, by the queue control memory, the active flag for each bank;
storing, by the queue control memory, for each virtual storage address used on the virtual data memory, a subsequent address indicating a virtual storage address of communication data subsequent to communication data written to each virtual storage address;
storing, by the queue control memory, for each queue, a queue start address and a queue last address indicating a start and a last of the virtual storage address to which the communication data of each queue is written; and storing, by the queue control memory, in common to each of the plurality of queues, a next writing address for each bank indicating a virtual storage address to which communication data is to be written next, the next writing address corresponding one-to-one to the write pointer for each bank.

16. The method according to claim 15, further comprising:
- instructing, by the writing control device, when the communication data is written into the write-target queue, the DRAM access device to write the communication data to a write-target virtual address including the next writing address of a bank selected as the write-target bank;
- updating, by the writing control device, a queue last address of the write-target queue, a subsequent address for the queue last address before the communication data is written, and a next writing address of the bank selected as the write-target bank;
- setting, by the writing control device, an active flag of the write-target bank to a value indicating an activated state if a row address of a current write pointer corresponding to the write-target virtual address of the write-target bank and a row address of an updated write pointer corresponding to an updated next writing address are the same; and
- setting, by the writing control device, the active flag to a deactivated state if the row addresses are different from each other.

17. The method according to claim 16, the method further comprising:
- instructing, by the reading control device, when the communication data is read from the read-target queue, the DRAM access device to read the communication data from a read-target virtual address including a queue start address of the read-target queue;
- updating, by the reading control device, a queue start address of the read-target queue, a next writing address of a read-target bank, and a subsequent address for a next writing address of a new read-target bank;
- setting, by the reading control device, an active flag of the read-target bank to a value indicating an activated state if a row address of a read pointer corresponding to the read-target virtual address of the read-target bank and the row address of the updated write pointer corresponding to the updated next writing address are the same; and
- setting, by the reading control device, the active flag to a deactivated state if the row addresses are different from each other.

18. The method according to claim 13, the method further comprising storing, by a queue-using address number memory of the recording device, for each queue, a number of used addresses indicating a number of virtual storage addresses on the data memory used by the plurality of queues.

19. The method according to claim 18, further comprising:
- calculating, by an access arbitrator of the recording device, a required number of addresses indicating a number of virtual storage addresses required for writing the communication data, based on a data length of the communication data, when the communication data is written into the write-target queue;
- calculating, by the access arbitrator of the recording device, a number of remaining addresses indicating a number of virtual storage addresses available for the writing, based on a number of used addresses of the write-target queue or the plurality of queues that is acquired from the queue-using address number memory;
- determining, by the access arbitrator of the recording device, whether writing the communication data is available by comparing the required number of addresses and the number of remaining addresses; and
- instructing, by the access arbitrator of the recording device, writing of the communication data in response to a determination that the writing is available.

20. The method according to claim 13, wherein selecting the write-target bank further comprises:
- performing identical row address VAR processing to search for a VAR that is selectable and has a row address identical to that in a latest access history of the same bank recorded in a plurality of access histories;
- when no VAR is identified that is selectable and has the row address identical to that in the latest access history of the same bank, performing active VAR search processing to search a VAR of a bank whose AFR indicates an activated state;
- when no VAR is identified that is selectable and is of a bank whose AFR indicates an activated state, performing not-recorded bank VAR search processing to search a VAR of a bank with no record that is not recorded in any of the plurality of access histories; and
- when no VAR is identified that is selectable and is of a bank with no record, performing preprocessing fastest completing bank VAR search processing to search a VAR of a bank whose latest access history of the same bank recorded in the plurality of access histories is oldest in all the banks.

* * * * *